(12) United States Patent
Katoh et al.

(10) Patent No.: US 8,416,225 B2
(45) Date of Patent: Apr. 9, 2013

(54) DISPLAY DEVICE

(75) Inventors: Hiromi Katoh, Osaka (JP); Kazuhiro Maeda, Osaka (JP); Christopher Brown, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/529,476

(22) PCT Filed: Apr. 9, 2008

(86) PCT No.: PCT/JP2008/057030
§ 371 (c)(1),
(2), (4) Date: Sep. 1, 2009

(87) PCT Pub. No.: WO2008/126872
PCT Pub. Date: Oct. 23, 2008

(65) Prior Publication Data
US 2010/0013813 A1    Jan. 21, 2010

(30) Foreign Application Priority Data
Apr. 9, 2007    (JP) .................. 2007-102136

(51) Int. Cl.
G06F 3/038    (2006.01)
G09G 5/00    (2006.01)

(52) U.S. Cl. ........................ 345/207; 250/214

(58) Field of Classification Search .................. 345/207, 345/166; 250/200, 553
See application file for complete search history.

(56) References Cited

U.S. PATENT DOCUMENTS
2005/0045881 A1*  3/2005  Nakamura et al. ............. 257/59
2006/0071893 A1   4/2006  Nishina et al.
2006/0149493 A1*  7/2006  Sambandan et al. .......... 702/118
2006/0262055 A1*  11/2006 Takahara ........................ 345/81

FOREIGN PATENT DOCUMENTS
JP    2004-126721    4/2004
JP    2007-11228     1/2007
JP    2007-18458     1/2007

OTHER PUBLICATIONS

Nakamura, T. et al., "A Touch Panel Function Integrated LCD Including LTPS A/D Converter", SID 05 DIGEST, (2005), pp. 1054-1055.

* cited by examiner

Primary Examiner — Kevin M Nguyen
Assistant Examiner — Kenneth B Lee, Jr.
(74) Attorney, Agent, or Firm — Nixon & Vanderhye P.C.

(57) ABSTRACT

Provided is a display device that has a photodetection element within a pixel and can calibrate automatically a photo sensor signal during an operation of the display device. A sensor row driver (5) has a first operation mode for supplying a sensor drive signal of a first pattern to a photo sensor in a pixel region (1) and outputting a photo sensor signal corresponding to a quantity of receiving light to a signal processing circuit (8), a second operation mode for supplying a sensor drive signal of a second pattern and acquiring a first photo sensor signal level for calibration corresponding to the case where a black level is detected, and a third operation mode for supplying a sensor drive signal of a third pattern and acquiring a second photo sensor signal level for calibration corresponding to the case where a white level is detected. During the first operation mode, a third photo sensor signal level for calibration is acquired from a dummy pixel. The signal processing circuit (8) calibrates the photo sensor signal from an effective pixel during the first operation mode by using the first to third photo sensor signal levels.

16 Claims, 13 Drawing Sheets

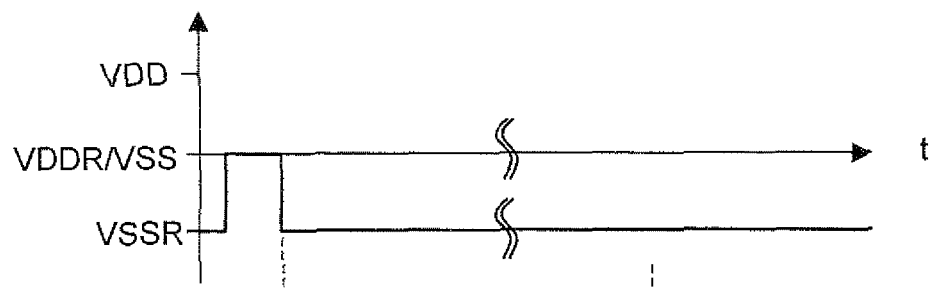
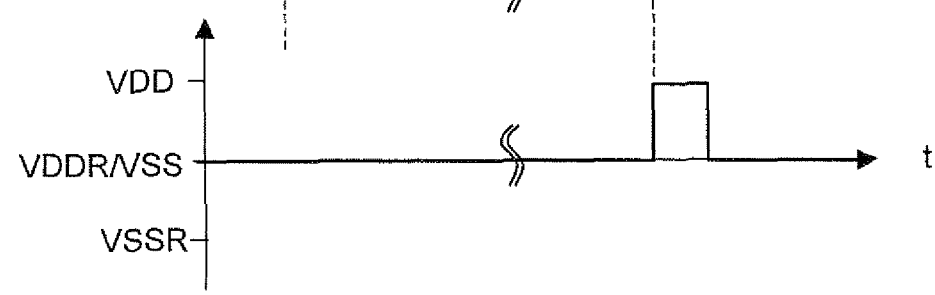
FIG. 3

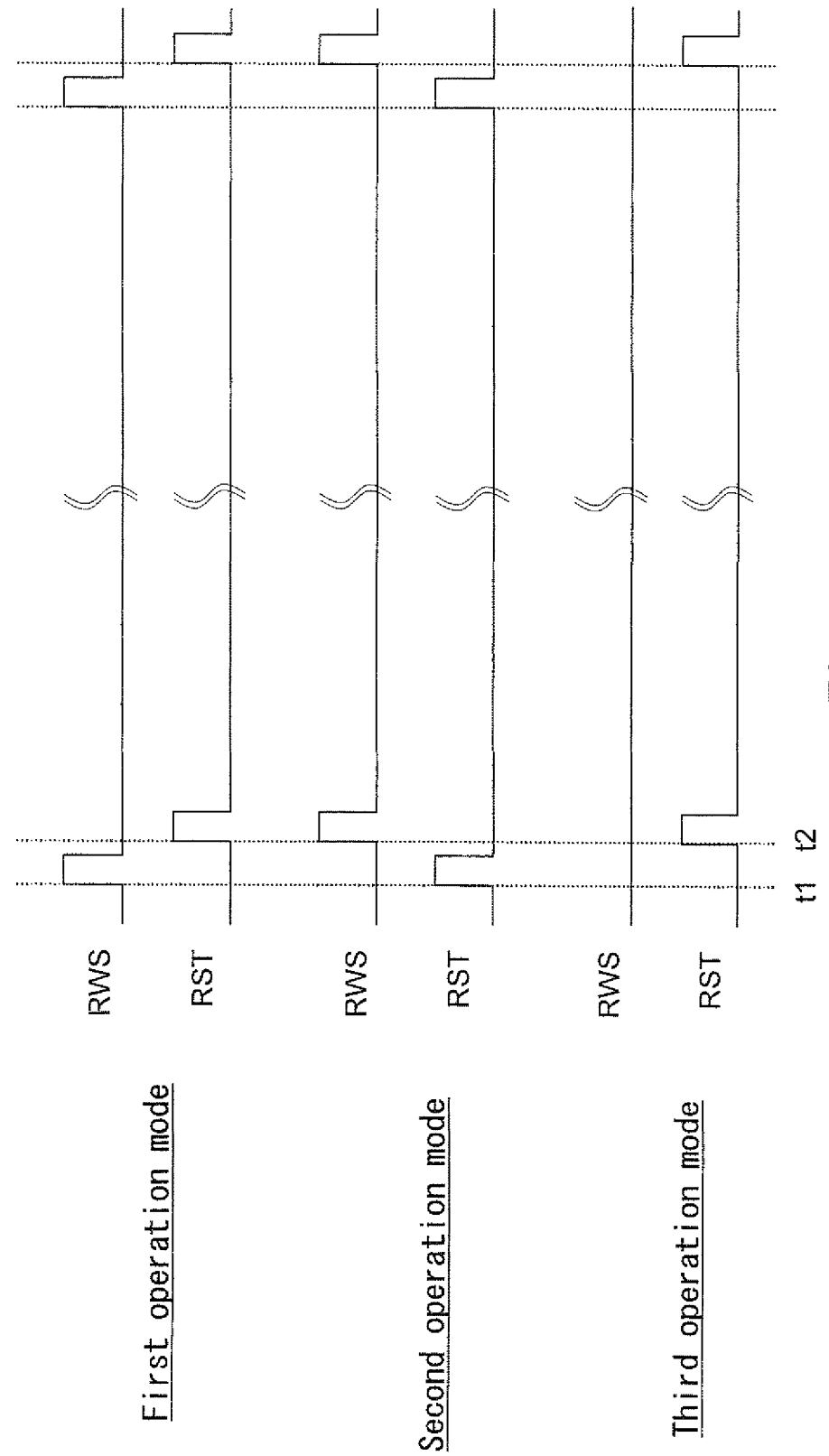

DISPLAY DEVICE

This application is the U.S. national phase of International Application No. PCT/JP2008/057030, filed 9 Apr. 2008, which designated the U.S. and claims priority to Japan Application No. 2007-102136, filed 9 Apr. 2007, the entire contents of each of which are hereby incorporated by reference.

TECHNICAL FIELD

The present invention relates to a display device having a photodetection element such as a photodiode within a pixel. Specifically the present invention relates to a display device capable of automatically calibrating a photo sensor signal during an operation of the display device.

BACKGROUND ART

Conventionally, there have been proposed display devices with image capturing function capable of capturing an image of an object in the proximity of their displays by means of, for instance, photodetection elements such as photodiodes in the pixels. Such display devices with image capturing function are intended to be used as display devices for interactive communications and display devices with touch-screen function.

In a conventional display device with image capturing function, when well-known components such as signal lines, scan lines, thin film transistors (TFTs), and pixel electrodes are formed on an active matrix substrate using a semiconductor process, photodiodes are formed in the pixels at the same time. The conventional display devices with image capturing function are disclosed by JP 2006-3857 A and "A Touch Panel Function Integrated LCD Including LTPS A/D Converter", T. Nakamura et al., SID 05 DIGEST, pp. 1054-1055, 2005, for instance.

DISCLOSURE OF INVENTION

Problem to be Solved by the Invention

In the meantime, since the output of the photodetection element such as the photodiode is typically at a low level, the output is amplified at an amplifier and outputted to a signal processing circuit. Therefor before the output of the photodetection element is outputted finally as a photo sensor signal, it will contain an offset inherent in the circuit such as the amplifier in the panel. It is required to calibrate such a photo sensor signal for the purpose of adjusting these offset and gain.

For calibrating the offset and gain, it is required to acquire respectively a photo sensor signal for the case where the photo sensor detects a black level and a photo sensor signal for the case where the photo sensor detects a white level. Concerning the acquirement of the former photo sensor signal of black level, a so-called double-sampling method is known. This denotes a method of applying a readout signal immediately after a reset operation. However, concerning the acquirement of the latter photo sensor signal of white level, an additional operation such as placing a white paper or the like in front of the photo sensor is required. As a result, it has been impossible to automatically calibrate the offset and gain of a photo sensor signal during an ordinary operation of the display device. In particular, since the level of dark current varies in accordance with the temperature change in the photo sensor such as the photodiode, errors of the photo sensor signal will be increased with the rise of the device temperature during the operation of the display device.

Therefore, with the foregoing in mind, it is an object of the present invention to provide a display device having a photodetection element within a pixel, in particular, a display device that can calibrate automatically a photo sensor signal during an operation of the display device.

Means for Solving Problem

A display device according to an embodiment of the present invention includes: an active matrix substrate; a photo sensor provided on a pixel region of the active matrix substrate; a sensor drive wiring connected to the photo sensor; a sensor drive circuit that supplies a sensor drive signal to the photo sensor via the sensor drive wiring; an amplifier circuit that amplifies a sensor output read out from the photo sensor in accordance with the sensor drive signal and outputs the sensor output as a photo sensor signal; and a signal processing circuit that processes the photo sensor signal outputted from the amplifier circuit. The sensor drive circuit has operation modes of a first operation mode for supplying a sensor drive signal of a first pattern to the photo sensor so as to output a photo sensor signal corresponding to a quantity of receiving light of the photo sensor to the signal processing circuit; a second operation mode for supplying a sensor drive signal of a second pattern to the photo sensor so as to acquire a first photo sensor signal level for calibration corresponding to a case where the photo sensor detects a black level; and a third operation mode for supplying a sensor drive signal of a third pattern to the photo sensor so as to acquire a second photo sensor signal level for calibration corresponding to a case where the photo sensor detects a white level. The display device further includes a dummy pixel covered with a light-shield film on the pixel region, and during the first operation mode, it acquires the level of the photo sensor signal obtained on the basis of a sensor output from a photo sensor provided within the dummy pixel, as a third photo sensor signal level for calibration, and calibrates the photo sensor signal obtained on the basis of the sensor output from the photo sensor provided within the effective pixel during the first operation mode, in the signal processing unit by using the first to third photo sensor signal levels.

Effects of the Invention

The present invention can provide a display device having a photodetection element in the pixel, in particular a display device that can calibrate automatically a photo sensor signal during an operation of the display device.

BRIEF DESCRIPTION OF DRAWINGS

FIG. 3 is a timing chart showing respective waveforms of a reset signal and a readout signal.

FIG. 10 is a waveform diagram showing another example of patterns of the reset signals and the readout signals in the respective first to third operation modes for the display device according to the first embodiment.

DESCRIPTION OF THE INVENTION

Figure 1:
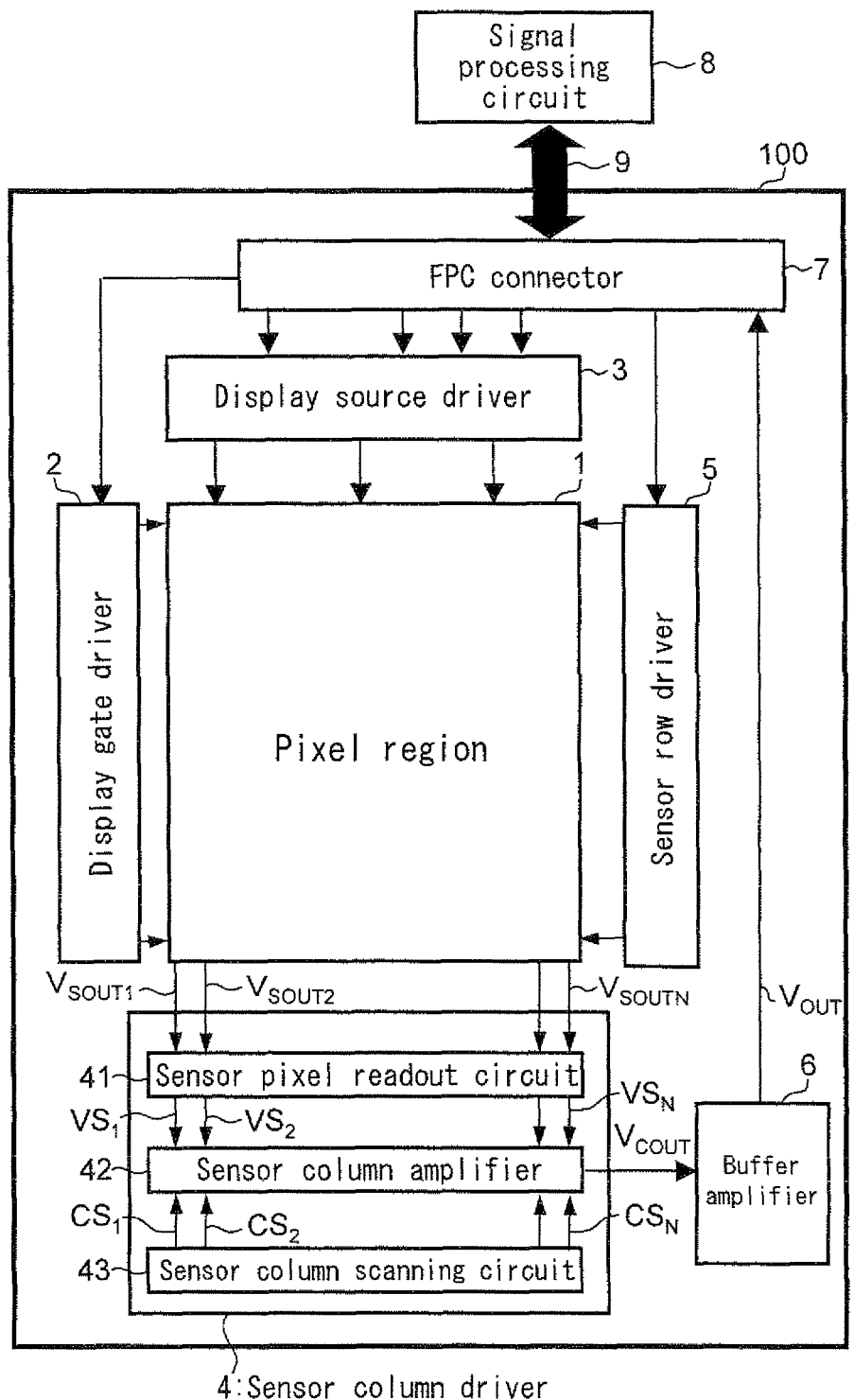
FIG. 1 is a block diagram showing a schematic configuration of a display device according to an embodiment of the present invention.

A display device according to an embodiment of the present invention includes: an active matrix substrate; a photo sensor provided on a pixel region of the active matrix substrate; a sensor drive wiring connected to the photo sensor; a sensor drive circuit that supplies a sensor drive signal to the photo sensor via the sensor drive wiring; an amplifier circuit that amplifies a sensor output read out from the photo sensor in accordance with the sensor drive signal and outputs the sensor output as a photo sensor signal; and a signal processing circuit that processes the photo sensor signal outputted from the amplifier circuit. The sensor drive circuit has operation modes of: a first operation mode for supplying a sensor drive signal of a first pattern to the photo sensor so as to output a photo sensor signal corresponding to a quantity of receiving light of the photo sensor to the signal processing circuit; a second operation mode for supplying a sensor drive signal of a second pattern to the photo sensor so as to acquire a first photo sensor signal level for calibration corresponding to a case where the photo sensor detects a black level; and a third operation mode for supplying a sensor drive signal of a third pattern to the photo sensor so as to acquire a second photo sensor signal level for calibration corresponding to a case where the photo sensor detects a white level. The display device further includes a dummy pixel covered with a light-shield film on the pixel region, and during the first operation mode, it acquires the level of the photo sensor signal obtained on the basis of a sensor output from a photo sensor provided within the dummy pixel, as a third photo sensor signal level for calibration, and calibrates the photo sensor signal obtained on the basis of the sensor output from the photo sensor provided within the effective pixel during the first operation mode, in the signal processing unit by using the first to third photo sensor signal levels.

According to this configuration, a first photo sensor signal level for calibration corresponding to the case where the photo sensor detects a black level and also a second photo sensor signal level for calibration corresponding to a case where the photo sensor detects a white level are acquired during an operation of the display device, by switching the sensor drive signal to a second pattern or to a third pattern. Further, in the first operation mode, a third photo sensor signal level for calibration is acquired from the photo sensor within the dummy pixel covered with a light-shield film. The third photo sensor signal level reflects variation of a dark current of a photo sensor, which is caused by temperature change. Therefore, the signal processing circuit calibrates the photo sensor signal obtained from the photo sensor in the effective pixel during the first operation mode by using the first to third photo sensor signal levels, thereby the photo sensor signal can be calibrated automatically during an operation of the display device, and at the same time, an error caused by the dark current variation due to the temperature change can be calibrated accurately.

It is preferable that a level of a photo sensor signal obtained on the basis of sensor outputs from photo sensors provided within a plurality of rows or a plurality of columns of dummy pixels is used as the third photo sensor signal level. By using the levels of the photo sensor signals obtained on the basis of the sensor outputs from the photo sensors provided in the plural rows or plural columns of dummy pixels, errors caused by variation in the dark current due to the temperature change can be calibrated accurately.

It is also preferable that a level of a photo sensor signal obtained on the basis of sensor outputs from photo sensors provided within a plurality of dummy pixels belonging to a common row or a common column is used as the third photo sensor signal level. Alternatively, it is preferable that a level of a photo sensor signal obtained on the basis of a sensor output from a photo sensor provided within a single dummy pixel is used. According to these configurations, the calibration accuracy may deteriorate in comparison with the case of using levels of photo sensor signals obtained on the basis of the sensor outputs from the photo sensors provided within plural rows or plural columns of dummy pixels. Nevertheless, it is advantageous in that load of computation in the signal processing circuit can be decreased.

In the above-mentioned configuration, it is preferable that the sensor drive wiring comprises a reset signal wiring connected to the photo sensor, and a readout signal wiring connected to the photo sensor; and the sensor drive signal comprises a reset signal supplied to the photo sensor via the reset signal wiring and a readout signal supplied to the photo sensor via the readout signal wiring.

In the above-mentioned configuration, it is further preferable that the sensor drive circuit supplies the reset signal to the photo sensor and supplies the readout signal after a predetermined time in the first operation mode, thereby outputting a photo sensor signal in accordance with the quantity of receiving light of the photo sensor within the predetermined time to the signal processing circuit; the sensor drive circuit supplies to the photo sensor a readout signal after starting supply of the reset signal in the second operation mode, thereby acquiring a first photo sensor signal level for calibration; and the sensor drive circuit supplies, in the third operation mode, a readout signal whose amplitude is smaller in comparison with the readout signal in the first operation mode to the photo sensor after starting supply of the reset signal, thereby acquiring a second photo sensor signal level for calibration.

In the above-mentioned configuration, "the readout signal whose amplitude is smaller in comparison with the readout signal in the first operation mode" in the third operation mode includes a case where the amplitude of the readout signal is zero. According to the above-mentioned configuration, the sensor drive circuit acquires the first photo sensor signal level and the second photo sensor signal respectively for calibration according to the second operation mode and the third operation mode. In the second operation mode, the readout signal is supplied after starting supply of the reset signal, and thus a photo sensor signal of a charging initial level of the photo sensor, namely, an offset quantity of a black level, is acquired as the first photo sensor signal level for calibration. In the third operation mode, by supplying a readout signal whose amplitude is smaller in comparison with the readout signal in the first operation mode after starting supply of the reset signal, an offset quantity inherent in the amplifier circuit and the various circuit elements contributing to the readout of the sensor output are acquired. Therefore, the signal processing circuit calibrates the photo sensor signal during the first operation mode by using the first photo sensor signal level and the second photo sensor signal level, thereby the photo sensor signal can be calibrated automatically during an operation of the display device.

It is preferable in the display device configured as mentioned above that in the second operation mode, the sensor drive circuit starts supplying the readout signal after starting supply of the reset signal but before ending supply of the reset signal. It is also preferable that in the third operation mode, the sensor drive circuit starts supplying the readout signal after starting supply of the reset signal but before ending supply of the reset signal. According to these configurations, since the periods for supplying the readout signal and the reset signal overlap each other, the period for supplying the sensor drive signal can be shortened, and thus an optical signal level for calibration can be acquired without imposing any substantial influences on the period for supplying a display signal.

Alternatively, it is preferable that the display device is configured so that in the second operation mode, the sensor drive circuit starts supplying the readout signal after starting supply of the reset signal and after ending supply of the reset signal. It is also preferable that in the third operation mode, the sensor drive circuit starts supplying a readout signal after starting supply of the reset signal and after ending supply of the reset signal. These configurations are advantageous in that an optical signal level for calibration with high accuracy can be acquired without influence of parasitic capacitance in the ON-state of the switching transistor in the photo sensor.

The display device can be configured so that the amplitude of the readout signal in the third operation mode is zero. Alternatively, the display device can be configured so that the amplitude of the readout signal in the third operation mode is a value for reading out a sensor output at the time of saturation of the photo sensor. In the latter case, it is preferable that the photo sensor comprises a photodiode and a capacitor connected to a cathode of the photodiode; and an amplitude $\Delta V_{RWS.WHITE}$ of a readout signal in the third operation mode is calculated through a formula below.

$$\Delta V_{RWS.WHITE} = (V_{RWS.H} - V_{RWS.L}) + (V_F - \Delta V_{RST}) \cdot C_T / C_{INT} + \Delta V_{RST} \cdot C_{PD} / C_{INT}$$

$$\Delta V_{RST} = V_{RST.H} - V_{RST.L}$$

Here, $V_{RWS.H}$ denotes a high level potential of a readout signal in the first operation mode, $V_{RWS.L}$ denotes a low level potential of a readout signal in the first operation mode, $V_F$ denotes a forward voltage of the photodiode, $V_{RST.H}$ denotes a high level potential of a reset signal, $V_{RST.L}$ denotes a low level potential of a reset signal, $C_T$ denotes a capacitance of a node between the photodiode and the capacitor, $C_{PD}$ denotes a capacitance of the photodiode, and $C_{INT}$ denotes a capacitance of the capacitor.

The present invention can be applied to a display device including the photo sensor having one switching element for sensor. It is preferable that the display device according to the present invention includes further a counter substrate that opposes the active matrix substrate; and a liquid crystal interposed between the active matrix substrate and the counter substrate.

Hereinafter, the embodiments of the present invention will be specified with reference to the attached drawings. The embodiments below show structural examples for a case of applying the display device of the present invention as a liquid crystal display device. It should be noted that the display device of the present invention is not limited to the liquid crystal display device but it can be applied to any arbitrary display device using an active matrix substrate. The display device of the present invention with image capturing function is expected to be applied, for instance, to a display device with a touch panel for detecting an object in the proximity of the screen for an input operation, and a device for interactive communications provided with display function and imaging function.

It should be noted, for each of the drawings, that only the main components among the components at every portion of the display device in the embodiments of the present invention are shown in a simplified manner while the remaining components are not shown, for the purpose of convenience in explanation. Therefore, the display device of the present invention may include arbitrary components not shown in each of the drawings for reference in the specification. It should be noted also that the dimensions of the components in each of the drawings do not necessarily indicate the actual dimensions of the components and dimensional ratios among the respective components and the like.

[First Embodiment]

First, the configuration of an active matrix substrate of a liquid crystal display device according to a first embodiment will be described with reference to FIGS. 1 and 2.

FIG. 1 is a block diagram showing schematically the configuration of an active matrix substrate 100 of a liquid crystal display device according to an embodiment of the present invention. As shown in FIG. 1, the active matrix substrate 100 includes a glass substrate on which at least a pixel region 1, a display gate driver 2, a display source driver 3, a sensor column driver 4, a sensor row driver 5, a buffer amplifier 6, and an FPC connector 7 are provided. Moreover, a signal processing circuit 8 for processing image signals captured by the photodetection element (described later) within the pixel region 1 is connected to the active matrix substrate 100 via the FPC connector 7 and an FPC 9.

It should be noted that the above-mentioned components provided on the active matrix substrate 100 can be formed on a glass substrate monolithically by a semiconductor process. Alternatively, the amplifier, the drivers and the like among the above-mentioned components can be mounted for instance on a glass substrate by a COG (Chip On Glass) technique or the like. Alternatively at least one of the above-mentioned components provided on the surface of the active matrix substrate 100 as shown in FIG. 1 can be mounted on the FPC 9. The active matrix substrate 100 is bonded to a counter substrate (not shown) on which a counter electrode is formed entirely, and the space therebetween is filled with a liquid crystal material.

The pixel region 1 is a region on which a plurality of pixels are formed to display a video image. In the present embodiment, a photo sensor for capturing an image is provided within every pixel in the pixel region 1. FIG. 2 is an equivalent circuit diagram showing the placement of the pixels and the photo sensors in the pixel region 1 of the active matrix substrate 100. In the example shown in FIG. 2, one pixel is composed of picture elements of three colors; red (R), green (G), and blue (B), and one photo sensor is provided in one pixel formed of the three picture elements. The pixel region 1 includes pixels arranged in a matrix of M rows and N columns and photo sensors also arranged in a matrix of M rows and N columns. It should be noted that the number of picture elements is M×3N, as described above.

Figure 2:
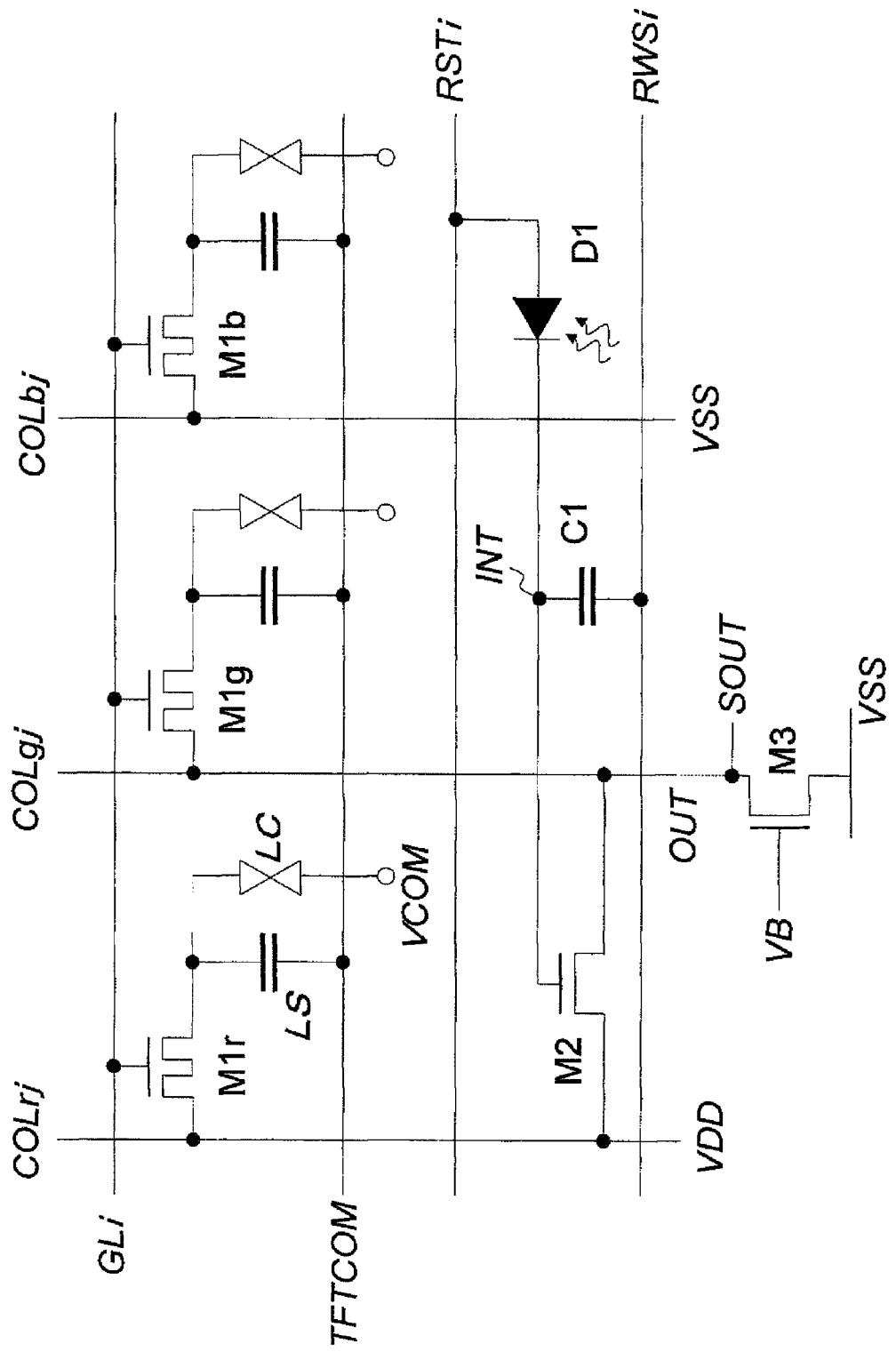
FIG. 2 is an equivalent circuit diagram showing a configuration of one pixel in the display device according to the embodiment of the present invention.

Therefore, as shown in FIG. 2, the pixel region 1 includes gate lines GL and source lines COL both of which are arranged in a matrix, as wirings for the pixels. The gate lines GL are connected to the display gate driver 2. The source lines COL are connected to the display source driver 3. The pixel region 1 includes M rows of the gate lines GL. Hereinafter, when it is necessary to discuss each of the gate lines GL, it will be indicated such as a gate line GLi (i=1 to M). In contrast, three source lines COL are provided per pixel as described above for supplying image data to three picture elements respectively in one pixel. When it is necessary to describe each of the source lines COL, it will be expressed as the source lines COLrj, COLgj, and COLgj (j=1 to N).

Thin film transistors (TFT) M1 are provided at intersection points of the gate lines GL and the source lines COL as switching element for the pixels. In FIG. 2, the thin film transistors M1 provided in the respective picture elements of red, green, and blue are denoted by reference numerals M1$r$, M1$g$, and M1$b$, respectively. The gate electrodes, the source electrodes, and the drain electrodes of the thin film transistors M1 are connected to the gate lines GL, the source lines COL, and pixel electrodes (not shown), respectively. A liquid crystal capacitor LC is formed between each of the drain electrodes of the thin film transistors M1 and a counter electrode (VCOM). Further, an auxiliary capacitor LS is formed between the drain electrode and the TFTCOM.

In FIG. 2, the picture element driven by the thin film transistor M1$r$ connected to the intersection point of the gate line GLi and the source line COLrj is provided with a red color filter so that the color of the filter matches this picture element. This picture element functions as a red picture element by receiving red image data from the display source driver 3 via the source line COLrj. The picture element driven by the thin film transistor M1$g$ connected to the intersection point of the gate line GLi and the source line COLgj is provided with a green color filter so that the color of the filter matches this picture element. This picture element functions as a green picture element by receiving green image data from the display source driver 3 via the source line COLgj. Furthermore, the picture element driven by the thin film transistor M1$b$ connected to the intersection point of the gate line GLi and the source line COLbj is provided with a blue color filter so that the color of the filter matches this picture element. This picture element functions as a blue picture element by receiving blue image data from the display source driver 3 via the source line COLbj.

In the example shown in FIG. 2, one photo sensor is provided in every one pixel (three picture elements) in the pixel region 1. The ratio between the number of the pixels and the number of the photo sensors, however, is not only limited to this example and can be changed arbitrarily. For instance, one photo sensor may be disposed per one picture element or one photo sensor may be disposed per a plurality of pixels.

As shown in FIG. 2, the photo sensor is composed of a photodiode D1 as a photodetection element, a capacitor C1, and a transistor M2. In the example of FIG. 2, a source line COLr functions also as a wiring VDD for supplying a constant voltage $V_{DD}$ from the sensor column driver 4 to the photo sensor. Further, a source line COLg functions also as a wiring OUT for sensor output.

To an anode of the photodiode D1, a wiring RST for supplying a reset signal is connected. To the cathode of the photodiode D1, one of the electrodes of the capacitor C1 and the gate of the transistor M2 are connected. The drain of the transistor M2 is connected to the wiring VDD, and the source is connected to the wiring OUT. In FIG. 2, the node between the cathode of the photodiode D1, one of the electrodes of the capacitor C1 and the gate of the transistor M2, is expressed as INT. The other electrode of the capacitor C1 is connected to the wiring RWS for supplying a readout signal. The wirings RST and RWS are connected to the sensor row driver 5. Since these wirings RST and RWS are provided for every one row, hereinafter the wirings will be expressed as RSTi, RWSi (i=1–M) when there is a necessity of distinguishing the respective wirings.

The sensor row driver 5 selects in sequence the pairs of wirings RSTi and RWSi as shown in FIG. 2 at a predetermined time interval $t_{row}$. Thereby, the row of the photo sensors from which the signal charge should be read out in the pixel region 1 is selected in sequence.

Here, as shown in FIG. 2, the drain of an insulated-gate field-effect transistor M3 is connected to the end of the wiring OUT. An output wiring SOUT is connected to the drain of this transistor M3, and potential $V_{SOUT}$ of the drain of the transistor M3 is outputted as an output signal from the photo sensor to the sensor column driver 4. The source of the transistor M3 is connected to a wiring VSS. The gate of the transistor M3 is connected to a reference voltage source (not shown) via a reference voltage wiring VB.

Here, readout of sensor output from the pixel region 1 will be described with reference to FIG. 3. FIG. 3 is a timing chart showing waveforms of signals supplied to the photo sensor, namely, a reset signal supplied from the wiring RST and a readout signal supplied from the wiring RWS. As shown in FIG. 3, the high level $V_{RST.H}$ of the reset signal is 0 V, and the low level $V_{RST.L}$ is −4 V. In this example, the high level $V_{RST.H}$ of the reset signal is equal to $V_{SS}$. The high level $V_{RWS.H}$ of the readout signal is 8 V, and the low level $V_{RWS.L}$ is 0 V. In this example, the high level $V_{RWS.H}$ of the readout signal is equal to $V_{DD}$, and the low level $V_{RWS.L}$ is equal to $V_{SS}$.

First, the reset signal supplied from the sensor row driver 5 to the wiring RST rises from the low level (−4 V) to the high level (0 V), and then the photodiode D1 becomes a forward direction bias, and the potential $V_{INT}$ at the node INT is expressed by the following formula (1).

$$V_{INT} = V_{RST.H} - V_F - \Delta V_{RST} C_{PD}/C_T \quad (1)$$

In the formula (1), $V_{RST.H}$ is 0 V as the high level for the reset signal, $V_F$ denotes the forward direction voltage of the photodiode D1, $\Delta V_{RST}$ denotes the pulse height of the reset signal ($V_{RST.H} - V_{RST.L}$), and $C_{PD}$ denotes the capacitance of the photodiode D1. $C_T$ denotes the total capacitance of the node INT, which is the sum of the capacitance $C_{INT}$ of the capacitor 1, the capacitance $C_{PD}$ of the photodiode D1, and the capacitance $C_{TFT}$ of the transistor M2. Since the $V_{INT}$ at this time is lower than the threshold voltage of the transistor M2, the transistor M2 is in a non-conductive state during the reset period.

Next, due to the return of the reset signal to the low level $V_{RST.L}$, an integral period ($t_{INT}$) of the photoelectric current starts. In the integral period, the photoelectric current proportional to the incident light quantity to the photodiode D1 flows into the capacitor C1 so as to discharge the capacitor C1. Thereby, the potential $V_{INT}$ of the node INT at the end of the integral period is expressed by the following formula (2).

$$V_{INT}=V_{RST.H}-V_F-\Delta V_{RST} \cdot C_{PD}/C_T-I_{PHOTO} \cdot t_{INT}/C_T \quad (2)$$

In the formula (2), $I_{PHOTO}$ denotes the photoelectric current of the photodiode D1, and $t_{INT}$ denotes the length of the integral period. Similarly during the integral period, as the $V_{INT}$ is lower than the threshold voltage of the transistor M2, the transistor M2 is in a non-conductive state.

When the integral period comes to an end, as shown in FIG. 3, the readout signal RWS rises and thus the readout period starts. Here, charge injection into the capacitor C1 occurs. As a result, the potential $V_{INT}$ of the node INT is expressed by the following formula (3).

$$V_{INT}=V_{RST.H}-V_F-I_{PHOTO} \cdot t_{INT}/C_T+\Delta V_{RWS} \cdot C_{INT}/C_T \quad (3)$$

$\Delta V_{RWS}$ denotes the pulse height of the readout signal ($V_{RWS.H}-V_{RWS.L}$). As a result, the potential $V_{INT}$ of the node INT becomes higher than the threshold voltage of the transistor M2, and thus the transistor M2 becomes conductive and it functions as a source follower amplifier together with the bias transistor M3 provided at the end of the wiring OUT in every column. Namely, the output signal voltage from the output wiring SOUT from the drain of the transistor M3 is equivalent to the integral value of the photoelectric current of the photodiode D1 in the integral period.

As mentioned above, the first operation mode for the display device according to the present embodiment denotes an operation of periodically performing one cycle composed of initialization by a reset pulse, integration of photoelectric current in an integral period, and readout of a sensor output in a readout period.

Figure 4:
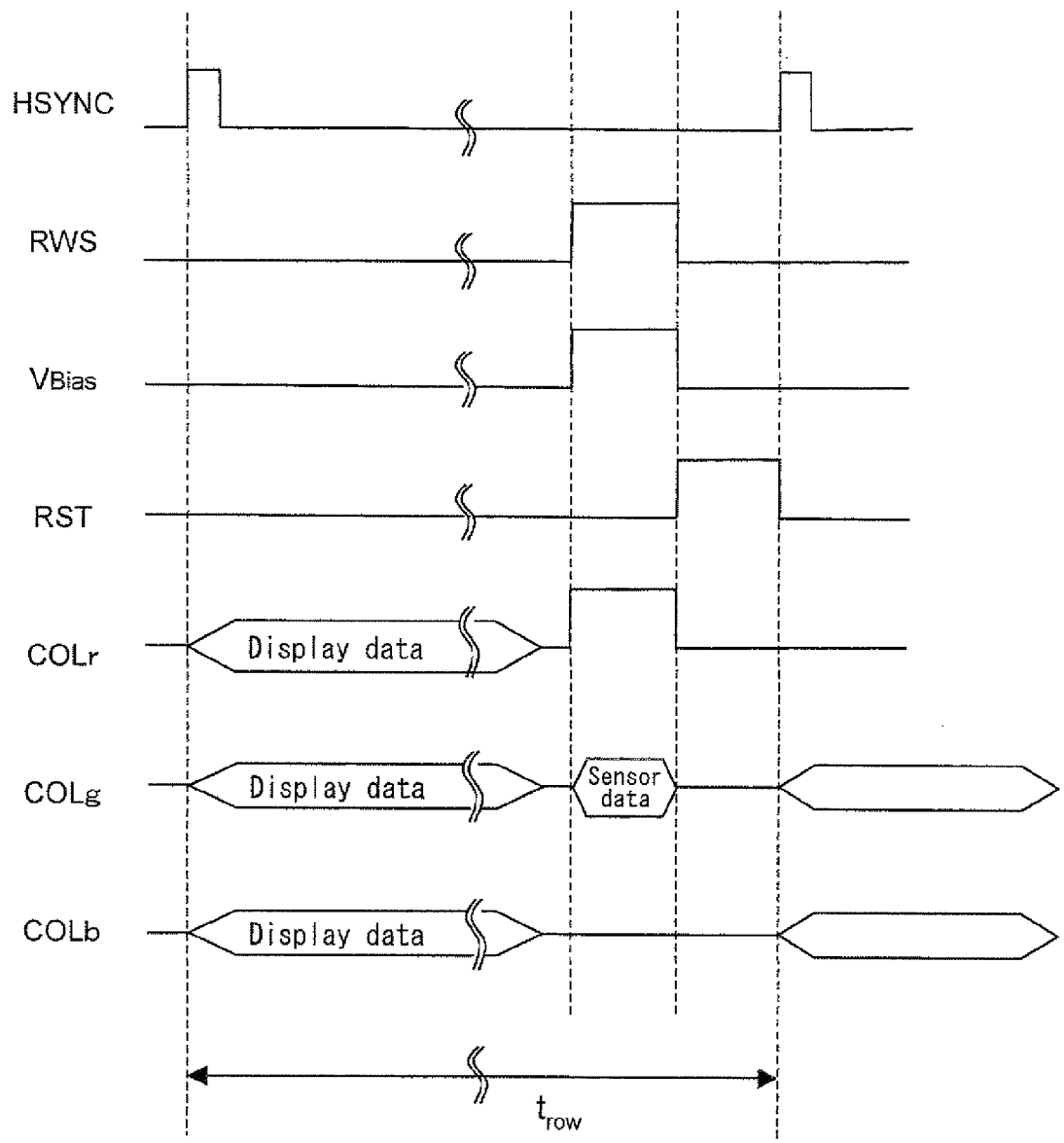
FIG. 4 is a timing chart showing a sensor drive timing in the display device according to the embodiment of the present invention.

As mentioned above, in the present embodiment, since the source lines COLr, COLg, and COLb are shared as the wirings VDD, OUT, and VSS for photo sensors, as shown in FIG. 4, it is required to distinguish the timing for inputting image data signals for display via the source lines COLr, COLg, and COLb, and the timing for reading out the sensor output. In the example of FIG. 4, after finishing the input of image data signal for display during the horizontal scanning period, readout of sensor output is performed according to the first operation mode by use of the horizontal blanking period or the like.

As shown in FIG. 1, the sensor column driver 4 includes the sensor pixel readout circuit 41, a sensor column amplifier 42, and a sensor column scanning circuit 43. A wiring SOUT (see FIG. 2) for outputting a sensor output $V_{SOUT}$ from the pixel region 1 is connected to the sensor pixel readout circuit 41. In FIG. 1, reference numeral $V_{SOUTj}$ denotes a sensor output from the wiring SOUTj (j=1 to N). The sensor pixel readout circuit 41 outputs a peak hold voltage $V_{Sj}$ of the sensor output $V_{SOUTj}$ to the sensor column amplifier 42. The sensor column amplifier 42 includes N column amplifiers corresponding respectively to the N columns of photo sensors in the pixel region 1. The sensor column amplifier 42 amplifies the peak hold voltage $V_{Sj}$ (j=1 to N) at each of its column amplifiers, and outputs the amplified peak hold voltage to the buffer amplifier 6 as $V_{COUT}$. The sensor column scanning circuit 43 outputs a column select signal $CS_j$ (j=1 to N) to the sensor column amplifiers 42 so as to connect the column amplifiers of the sensor column amplifiers 42 to outputs to the buffer amplifier 6 in sequence.

Figure 5:
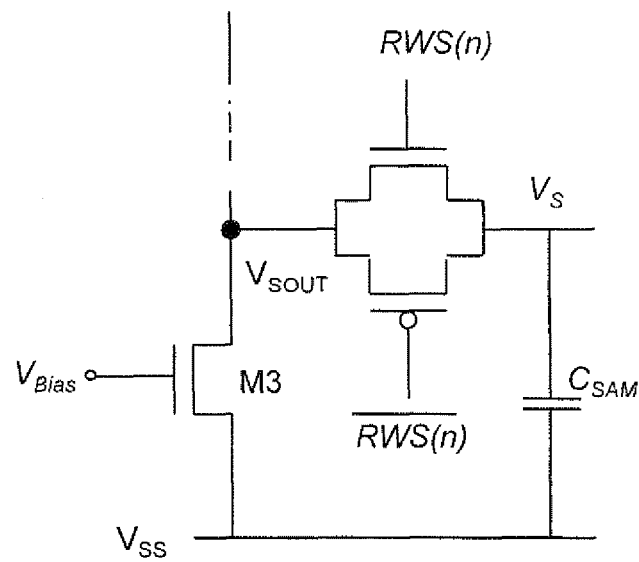
FIG. 5 is a circuit diagram showing an internal configuration of a sensor pixel readout circuit.
Figure 6:
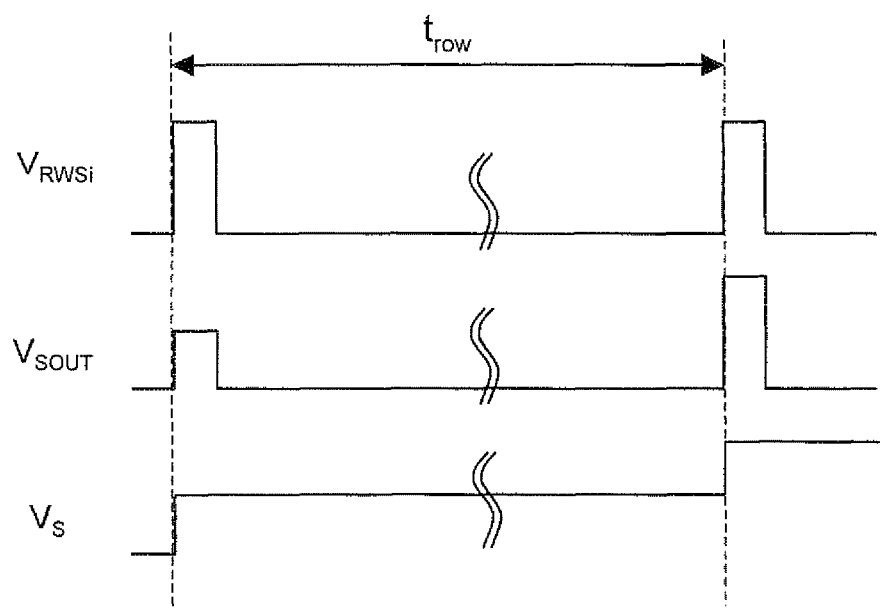
FIG. 6 is a waveform diagram showing a relationship between a readout signal, a sensor output, and an output of a sensor pixel readout circuit.

The following description refers to the operation of the sensor column driver 4 and the buffer amplifier 6 after the readout of the sensor output $V_{SOUT}$ from the pixel region 1, with reference to FIGS. 5 and 6. FIG. 5 is a circuit diagram showing the internal structure of the sensor pixel readout circuit 41. FIG. 6 is a waveform diagram showing the relationship between the readout signal $V_{RWS}$, the sensor output $V_{SOUT}$ and the output $V_S$ of the sensor pixel readout circuit. As described above, when the readout signal shifts to a high level $V_{RWS.H}$, the transistor M2 is conducted, thereby a source follower amplifier is formed by the transistors M2 and M3 and the sensor output $V_{SOUT}$ is stored in a sample capacitor $C_{SAM}$ of the sensor pixel readout circuit 41. As a result, even after the readout signal shifts to a low level $V_{RWS.L}$, an output voltage $V_S$ from the sensor pixel readout circuit 41 to the sensor column amplifier 42 is maintained as shown in FIG. 6 at a level equal to the peak value of the sensor output $V_{SOUT}$ in the period ($t_{row}$) during which the row is selected.

Figure 7:
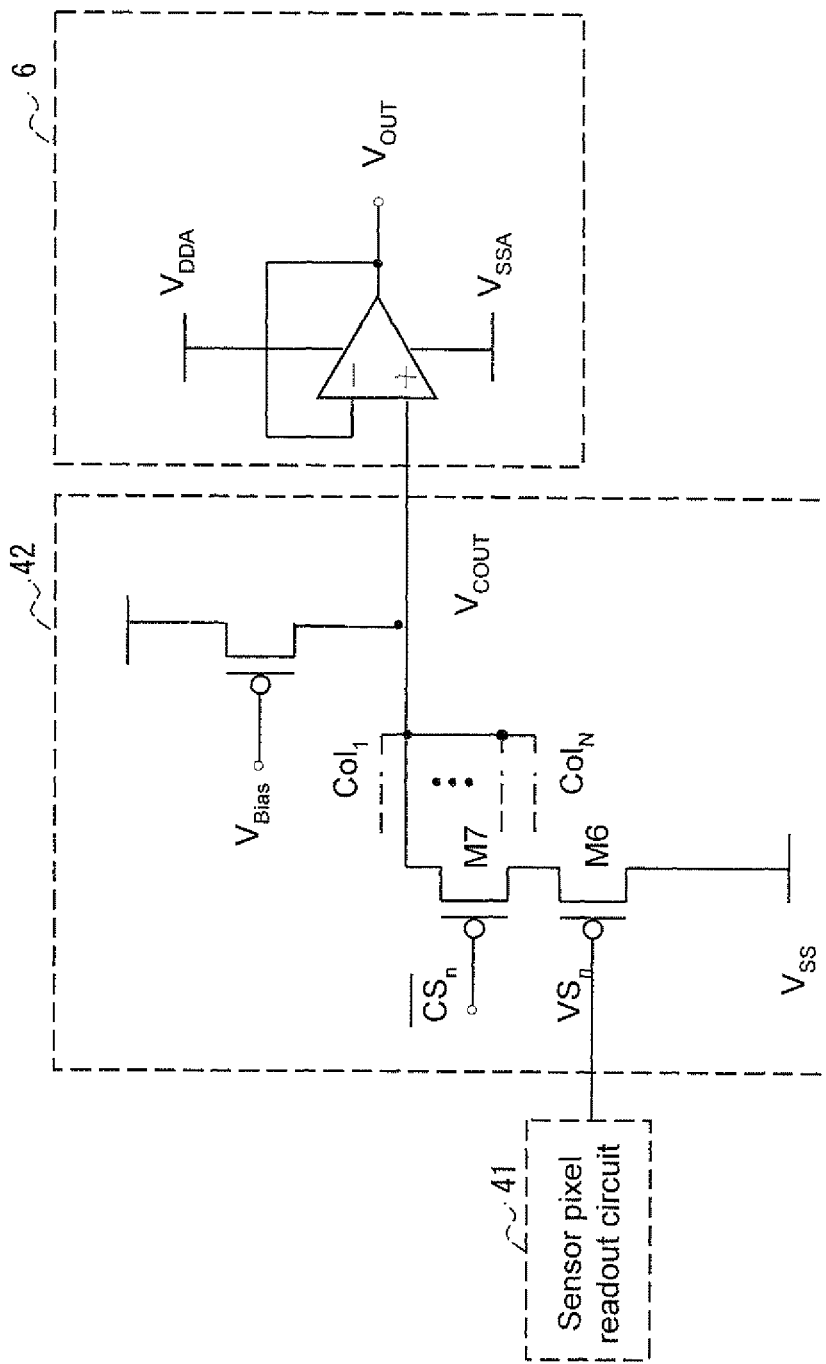
FIG. 7 is a circuit diagram showing a structural example of a sensor column amplifier.

Next, an operation of the sensor column amplifier 42 will be described with reference to FIG. 7. As shown in FIG. 7, in the sensor column amplifier 42, the output voltages $V_{Sj}$ (j=1 to N) of respective columns are inputted to the N column amplifiers from the sensor pixel readout circuit 41. As shown in FIG. 7, each column amplifier is formed of the transistors M6 and M7. Due to column select signals $CS_j$ generated by the sensor column scanning circuit 43 being turned ON in sequence with respect to the N respective columns in the period ($t_{row}$) for one row, a transistor MG of only one column amplifier among the N column amplifiers in the sensor column amplifier 42 is turned ON, and through that transistor M6, only one of the output voltages $V_{Sj}$ (j=1 to N) of respective columns is outputted as an output $V_{COUT}$ from the sensor column amplifier 42. The buffer amplifier 6 amplifies further the output $V_{COUT}$ from the sensor column amplifier 42, and outputs as a panel output (photo sensor signal) $V_{out}$ to the signal processing circuit 8.

It should be noted that the sensor column scanning circuit 43 may scan the columns of photo sensors column one by one or may interlace the columns of photo sensors. Further, the sensor column scanning circuit 43 may be formed as a multiphase, e.g., four phases, driving scanning circuit.

The display device configured as described above according to the present embodiment obtains a panel output $V_{OUT}$ corresponding to the quantity of receiving light of the photodiode D1 formed for every pixel in the pixel region 1, according to the first operation mode. The panel output $V_{OUT}$ is sent to the signal processing circuit 8 and A/D converted to be stored as panel output data in a memory (not shown). Namely, in this memory, panel output data of the number equivalent to the number of pixels in the pixel region 1 (the number of photo sensors) will be stored. At the signal processing circuit 8, the panel output data stored in the memory are used to perform various signal processes such as video image capturing and detection of a touch region. In the present embodiment, panel output data equivalent in the number to the pixels of the pixel region 1 (number of the photo sensors) will be stored in the memory of the signal processing circuit 8. However, it is not always required to store panel output data of the same number as the number of pixels depending on restrictions such as memory capacity.

The display device of the present invention has, other than the first operation mode for reading out a photo sensor signal for every pixel in the pixel region 1, a second operation mode to shift the reset signal to a high level and then shift the readout signal to a high level for the purpose of obtaining a first panel output $V_{Black}$ for calibration of the panel output, and a third operation mode to keep the readout signal at a low level and supply the reset signal only at a predetermined time interval for the purpose of obtaining a second panel output $V_{White}$ for calibration of the panel output. The first panel output $V_{Black}$ for calibration indicates an initial level for charging the photo sensors within the pixels, and it is used as an offset value of a black level. The second panel output $V_{White}$ for calibration is used as an offset value for the sensor column amplifier, the buffer amplifier and the like.

Furthermore, the display device of the present embodiment acquires a panel output obtained on the basis of the sensor output from the dummy pixel provided at the outermost periphery of the pixel region 1, as a third panel output $V_{Dark}$ for calibration, during the first operation mode. By using this third panel output $V_{Dark}$ for calibration, it is possible also to calibrate errors caused by variation of the dark current of the photodiode D1 that occurs in accordance with temperature change.

Here, the dummy pixel denotes a pixel formed at the outermost periphery of the pixel region 1 generally for the purpose of suppressing parasitic capacitance or the like. The number and location of the dummy pixels can be determined arbitrarily, as long as they are provided in at least one direction among four directions (upward, downward, right and left) in the pixel region 1. For instance, in a case where the pixels are arranged in a matrix of M rows and N columns in the pixel region 1 as described above, one or plural row(s) of pixels located the closest to the display source driver 3 among the M row of pixels can make the dummy pixels. Alternatively, in place of these pixels or together with these pixels, one or plural rows of pixels located the closest to the sensor column driver 4 can make the dummy pixels. Furthermore, among the N columns of pixels, one or plural columns of pixels located the closest to the display gate driver 2 can make the dummy pixels. Further, in place of these pixels or together with these pixels, pixels of one or plural columns located the closest to the sensor row driver 5 can make the dummy pixels. In the pixel region 1, the pixels other than the dummy pixels, which contribute to actual display, are called effective pixels.

Since the dummy pixels do not contribute to actual display, they are covered with a black mask (light-shield film) in order not to impose influences on the display of the effective pixels in the pixel region 1. In other words, ambient light is shielded by the black mask and thus it does not enter the photodiode D1 of the photo sensor provided within the dummy pixel. Therefore, the sensor output from the photo sensor in the dummy pixel is not influenced at all by the ambient light, and thus it reflects correctly the variation in the dark current value in accordance with the temperature change or the like.

Figure 8:
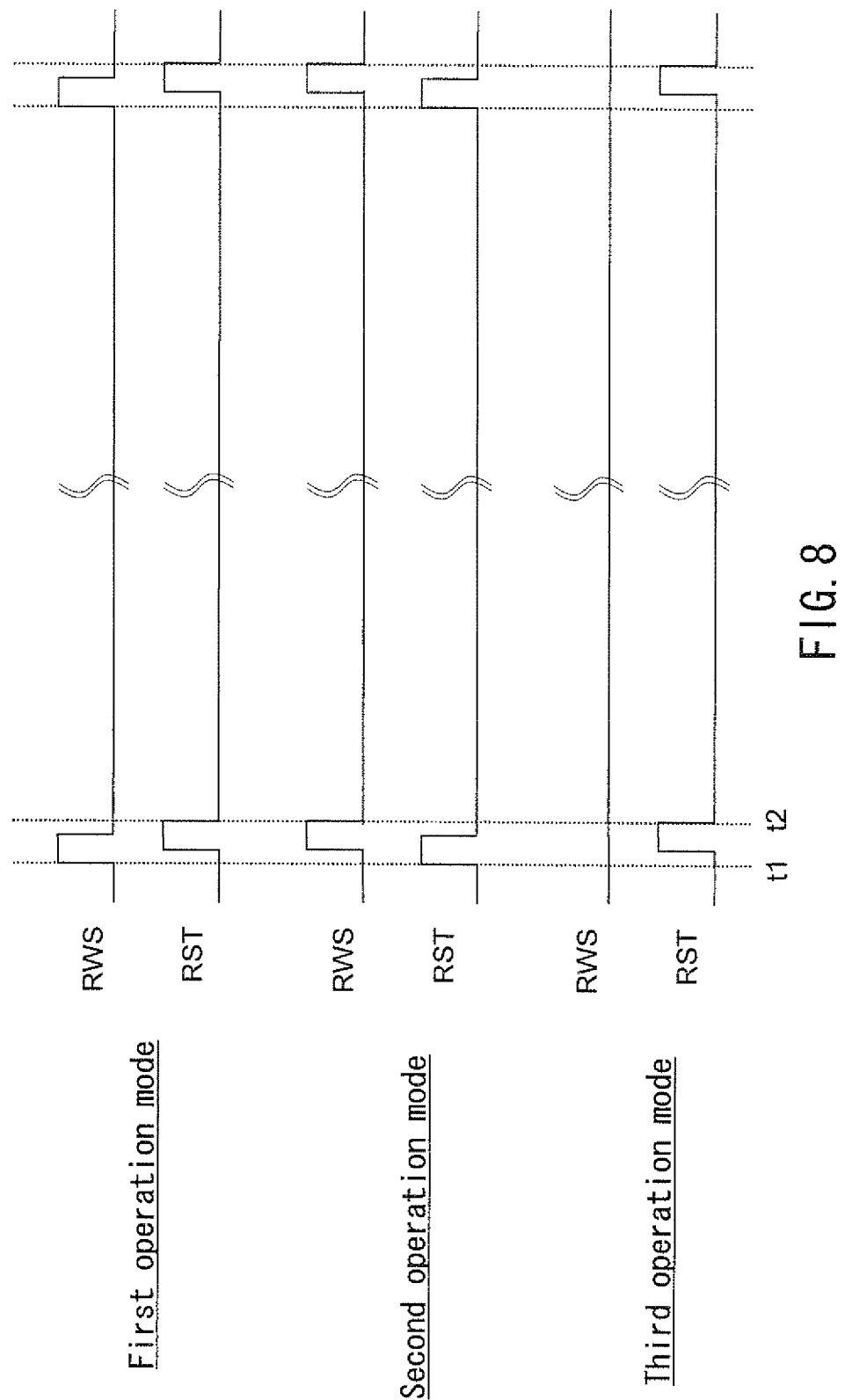
FIG. 8 is a waveform diagram showing an example of patterns of the reset signals and the readout signals in the respective first to third operation modes for a display device according to a first embodiment.

Hereinafter, the first to third operation modes will be described. The first to third operation modes are different from each other in the patterns of the reset signals and the readout signals. FIG. 8 is a waveform diagram showing an example of patterns of the reset signals and the readout signals in the respective first to third operation modes. FIG. 10 is a waveform diagram showing another example of patterns of the reset signals and the readout signals in the respective first to third operation modes. As shown in FIGS. 8 and 10, in the first operation mode, the reset signal supplied to the wiring RST shifts to a high level after the readout signal supplied from the sensor row driver 5 to the wiring RWS shifts to a high level. In the example of FIG. 8, in the first operation mode, during the readout signal is at a high level (before the readout signal shifts to a low level), the reset signal shifts to a high level. In the example as shown in FIG. 10, after the readout signal is shifted from a high level to a low level, the reset signal rises to a high level.

In the second operation mode, the timing that the reset signal shifts to a high level and the timing that the readout signal shifts to a high level are reversed from the case of the first operation mode. Namely, as shown in FIG. 8, in the second operation mode, the readout signal shifts to a high level after the reset signal shifts to a high level. In other words, the readout signal is shifted to a high level in the second operation mode at the timing that the reset signal shifts to a high level in the first operation mode, and the reset signal is shifted to a high level in the second operation mode at the timing that the readout signal shifts to a high level in the first operation mode. In the example of FIG. 8, in the first operation mode and the second operation mode, the period for supplying the reset signal (the period during which the reset signal is at a high level) and the period for supplying the readout signal (the period during which the readout signal is at a high level) overlap each other and thus the total time for supplying the sensor drive signal can be shortened. As mentioned below, since the supply of these sensor drive signals is performed within the display blanking period, such a short total time for supplying the sensor drive signal results in an advantage that the present invention can be applied to also the illustrated display device whose blanking period is short.

Figure 9A:
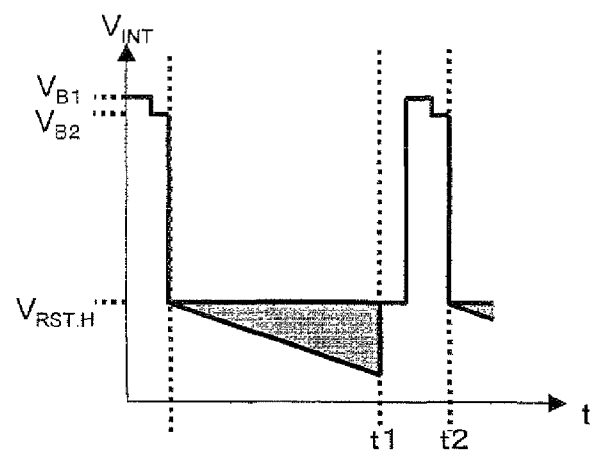
FIG. 9A is a waveform diagram of $V_{INT}$ in the second operation mode shown in FIG. 8.
Figure 9B:
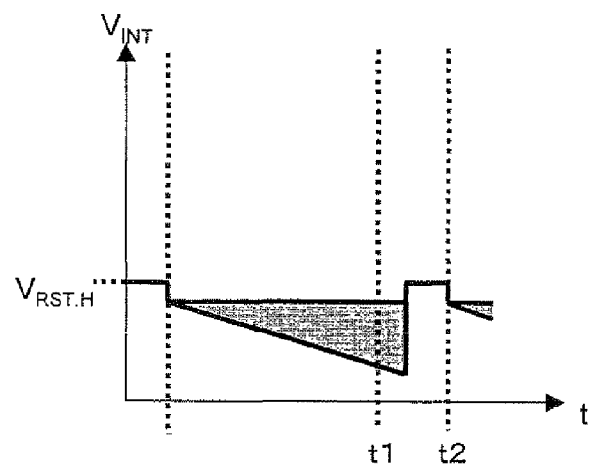
FIG. 9B is a waveform diagram of $V_{INT}$ in the third operation mode shown in FIG. 8.

FIG. 9A is a waveform diagram of $V_{INT}$ in the second operation mode as shown in FIG. 8, and FIG. 9B is a waveform diagram of $V_{INT}$ in the third operation mode as shown in FIG. 8. As shown in FIGS. 8 and 9A, in the second operation mode, the $V_{INT}$ value becomes a high-level potential ($V_{RST.H}$) of the reset signal at time t1 at which the reset signal shifts to a high level. Later, the $V_{INT}$ value rises to $V_{B1}$ by shifting the readout signal to a high level.

The $V_{B1}$ value can be expressed by the formula (4) below.

$$V_{B1} = \Delta V_{RWS} \cdot C_{INT}/C_T \qquad (4)$$

Here, $\Delta V_{RWS}$ denotes the pulse height of the readout signal ($V_{RWS.H} - V_{RWS.L}$). Since the potential $V_{INT}$ becomes higher than the threshold voltage of the transistor M2, the transistor M2 is becomes conductive, the sensor output $V_{SOUT}$ is read out from the photo sensor, and a panel output $V_{OUT}$ corresponding thereto is obtained. It should be noted however, that since the photodiode D1 itself has parasitic capacitance, the parasitic capacitance is charged after the supply of the reset signal in accordance with the parasitic capacitance quantity and the potential of $V_{INT}$ falls to $V_{B2}$ as shown in FIG. 9A. The value of the panel output $V_{OUT}$ obtained from the sensor output $V_{B2}$ after the fall of potential is used for the first panel output $V_{Black}$ for calibration of the panel output.

In the third operation mode as shown in FIGS. 8 and 9B, the timing and level for the reset signal are the same as those of the first operation mode, but the readout signal is kept at a low level. Thereby, since the potential $V_{INT}$ of the node INT is lower than the threshold voltage of the transistor M2 during the third operation mode, the transistor M2 is kept in an OFF state. As a result, the panel output $V_{OUT}$ outputted from the buffer amplifier 6 during the third operation mode does not include the sensor output from the photo sensor in the pixel region 1, and thus the value reflects only the offsets occurring at the sensor pixel readout circuit 41, a sensor column amplifier 42, the buffer amplifier 6 and the like. The value of the panel output $V_{OUT}$ at this time is used for the second panel output $V_{White}$ for calibration of the panel output.

Regarding the sensor drive signal pattern in FIG. 8, the period during which the readout signal is at a high level and the period during which the reset signal is at a high level overlap each other in the first and second operation modes. FIG. 10 shows an alternative pattern for the sensor drive signal pattern.

In the example as shown in FIG. 10, the period during which the readout signal is at a high level and the period during which the reset signal is at a high level do not overlap each other in the first and second operation modes. That is, during the first operation mode, the reset signal rises to a high level after the readout signal is shifted from a high level to a low level. During the second operation mode, the readout signal rises to a high level after the reset signal is shifted from a high level to a low level. In the example as shown in FIG. 10, the timing that the reset signal shifts to a high level is the same as that in the first operation mode.

Figure 11A:
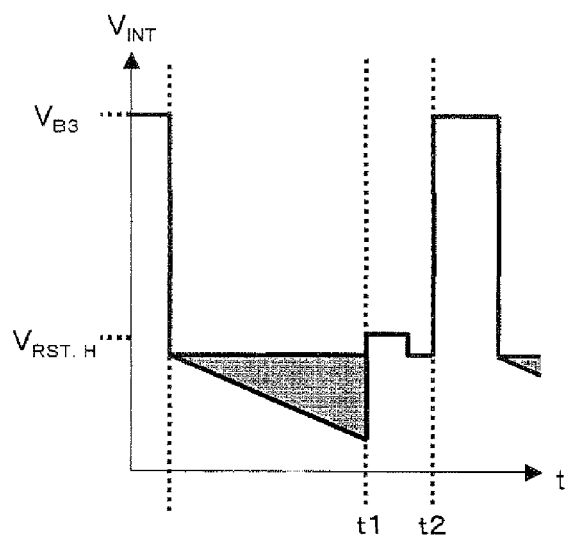
FIG. 11A is a waveform diagram of $V_{INT}$ in the second operation mode shown in FIG. 10.
Figure 11B:
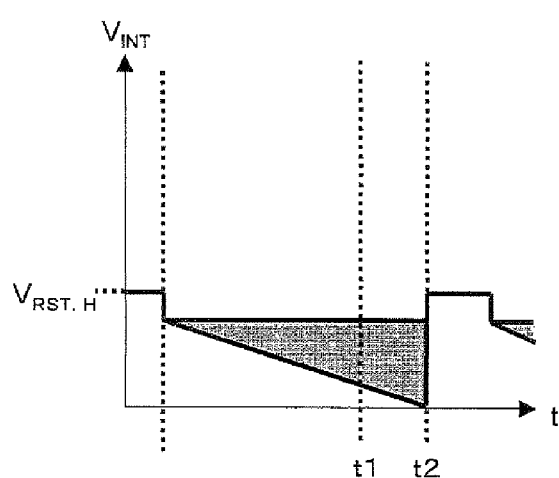
FIG. 11B is a waveform diagram of $V_{INT}$ in the third operation mode shown in FIG. 10.

During the second operation mode as shown in FIG. 10, in the period from the time that the reset signal is shifted from a high level to a low level to the time t2, the readout signal has not shifted yet to a high level. Therefore, as shown in FIG. 11A, the potential of $V_{INT}$ falls from the reset level ($V_{RST,H}$) in accordance with the charge to the parasitic capacitance of the photodiode D1. During this time period, since the potential of $V_{INT}$ is lower than the threshold voltage of the transistor M2, the transistor M2 is kept in an OFF state. And, since the readout signal shifts to a high level at the time t2, a sensor output $V_{B3}$ corresponding to the black level of the photo sensor is read out, and the value of the panel output $V_{OUT}$ on the basis of this sensor output $V_{B3}$ is used as the first panel output $V_{Black}$ for calibration of the panel output.

Since the sensor drive signal patterns for the first to the third operation modes as shown in FIGS. 8 and 10 are used respectively as frames independent from each other, they can be executed by combining arbitrarily the patterns of the respective modes. For instance, it is possible to combine and use the sensor drive signal pattern in the first operation mode as shown in FIG. 8 and the sensor signal patterns of the second and third operation modes as shown in FIG. 10. Alternatively, it is possible to combine and use the sensor drive signal patterns in the first and third operation modes as shown in FIG. 8 and the sensor drive signal pattern in the second operation mode as shown in FIG. 10.

As shown in FIGS. 9A and 11A, the sensor drive signal pattern in the second operation mode as shown in FIG. 8 and the sensor drive signal pattern in the second operation mode as shown in FIG. 10 are different from each other in the transition pattern of $V_{INT}$ obtained from these signal patterns. However, the difference is limited to the point that the voltage drop of $V_{INT}$ caused by the parasitic capacitance of the photodiode occurs either before or after starting supply of the readout signal. Therefore, there is no substantial difference in the degree of influence of the parasitic capacitance of the photodiode D1 with respect to $V_{Black}$ obtained by each of these signal patterns.

It should be noted however, that the sensor drive signal pattern in the second operation mode as shown in FIG. 8 and the sensor drive signal pattern in the second operation mode as shown in FIG. 10 are distinguished from each other in the degree of influences imposed on the accuracy of $V_{Black}$ obtained by each of these signal patterns, by the parasitic capacitances of the switching transistors (transistor M2) within the photo sensors. The reason is as follows.

Since there is an overlap in the periods of supplying the reset signal and the readout signal in the second operation mode in FIG. 8, the transistor M2 is in an ON state at the time of voltage drop immediately before the time t2 as shown in FIG. 9A Therefore, the value of $V_{Black}$ obtained according to this operation mode (i.e., $V_{B2}$ shown in FIG. 9A) is influenced by the parasitic capacitance in the ON state of the transistor M2. On the other hand, since there is no overlap in the periods for supplying the reset signal and the readout signal in the second operation mode as shown in FIG. 10, the transistor M2 is in an OFF state at the time of voltage drop immediately before the time t2 as shown in FIG. 11A Therefore, the value of $V_{Black}$ obtained according to this operation mode (i.e., $V_{B3}$ as shown in FIG. 11A) is influenced by the parasitic capacitance in the OFF state of the transistor M2. Since the parasitic capacitance in the OFF state is smaller than the parasitic capacitance in the ON state for a transistor, the voltage drop of $V_{INT}$ immediately before the time t2 as shown in FIG. 11A is smaller than the voltage drop of $V_{INT}$ immediately before the time t2 as shown in FIG. 9A Therefore, $V_{B2}$ as shown in FIG. 9A has a voltage level lower than that of $V_{B3}$ as shown in FIG. 11A. Similarly to the second operation mode in FIG. 8, the panel outputs obtained in the first and third operation modes in FIG. 8 are influenced by the parasitic capacitance in the OFF state of the transistor M2. Similarly, the panel outputs obtained in the first and third operation modes in FIG. 10 are influenced by the parasitic capacitance in the OFF state. Therefore, the value $V_{Black}$ obtained in the second operation mode in FIG. 8 (i.e., $V_{B2}$ as shown in FIG. 9A) is influenced by the parasitic capacitance in the ON state of the transistor M2, thereby includes an error factor different from those of the $V_{White}$ obtained in the third operation mode in FIG. 8, the value of $V_{Black}$ obtained in the second operation mode in FIG. 10 (i.e., $V_{B3}$ shown in FIG. 11A) and the value of $V_{White}$ obtained in the third operation mode in FIG. 10. Therefore, from the viewpoint of accuracy of the calibration data, for the purpose of obtaining the value of $V_{Black}$, the sensor drive signal pattern in the second operation mode in FIG. 10 is preferred to the sensor drive signal pattern in the second operation mode in FIG. 8.

It is preferable that the frame to be subjected to sensor drive according to the above-mentioned second operation mode and third operation mode is inserted with a predetermined spacing between the frames to be subjected to sensor drive according to the first operation mode. Namely, the sensor drive according to the first operation mode is performed by utilizing the horizontal blanking period or the like of the display as having been explained with reference to FIG. 4. Therefore, for instance in the vertical blanking period or in the horizontal scanning period of one or plural dummy row(s) provided above and below the pixel region, it is possible to insert a frame to be subjected to sensor drive according to the second operation mode or the third operation mode. The second operation mode and the third operation mode can be executed in two continuous frames, or they can be executed in discontinuous frames. Regarding the third operation mode, since there is no necessity of obtaining sensor output for every pixel, it is required only to acquire a panel output for an arbitrary one row.

Figure 9C:
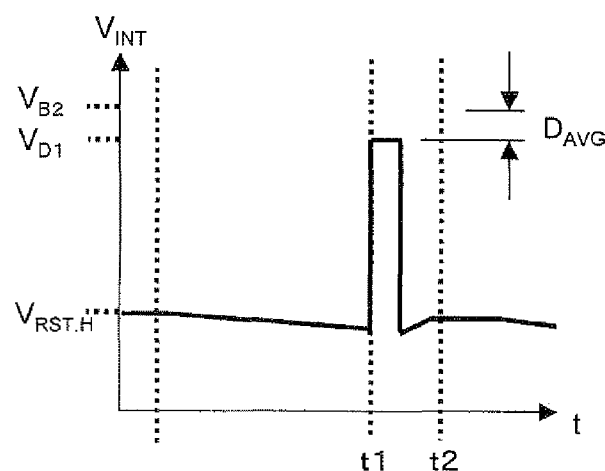
FIG. 9C is a waveform diagram of $V_{INT}$ of a photo sensor within a dummy pixel in the first operation mode shown in FIG. 8.
Figure 11C:
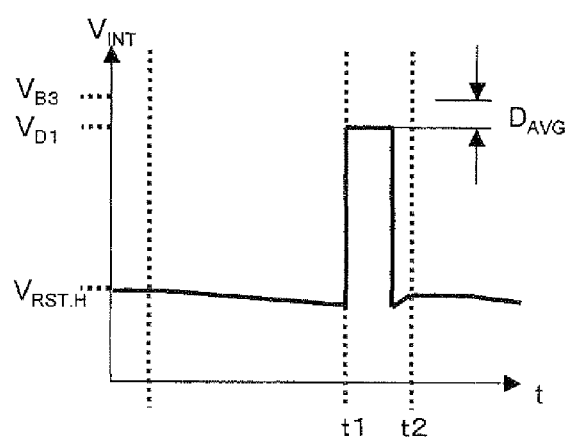
FIG. 11C is a waveform diagram of $V_{INT}$ of a photo sensor within a dummy pixel in the first operation mode shown in FIG. 11.

The potential $V_{INT}$ of the node INT at the time that the readout signal shifts to a high level in the first operation mode as shown in FIGS. 8 and 10 ($V_{D1}$ in FIG. 9C and $V_{D1}$ in FIG. 11C) is at a level lower by $D_{AVG}$ than $V_{B2}$ as shown in FIG. 9A and $V_{B3}$ as shown in FIG. 11A. This $D_{AVG}$ is equivalent to the voltage value lowered by the dark current during a period from the time that the reset signal shifts to a high level immediately before to the time that the readout signal shifts to a high level (integral period with respect to the effective pixel). Since $V_D$ becomes higher than the threshold voltage of the transistor M2, the transistor M2 become conductive, the sensor output $V_{SOUT}$ is read out from the photo sensor, and a panel output $V_{OUT}$ corresponding thereto can be obtained. The value of $V_{OUT}$ at this time is used for the third panel output $V_{Dark}$ for calibration of the panel output.

The following description is about a calibration process performed by the signal processing circuit 8 with respect to the photo sensor signal obtained from the photo sensor within the effective pixel in the first operation mode, using the first panel output $V_{Black}$ for calibration, the second panel output $V_{White}$ for calibration and the third panel output $V_{Dark}$ for calibration. This calibration process is performed for every pixel by using the formulae (5-1) to (5-3) below.

In each of the formulae (5-1) to (5-3), x, y denotes the address of every pixel in the pixel region 1. More specifically, x is the address in the column direction (horizontal direction) and y is the address in the row direction (vertical direction). Namely, in the case where the pixel region 1 has pixels in a matrix of M rows and N columns as mentioned above, x can take a value from 1 to N, and y can take a value from 1 to M. In formula (5-3), L denotes a base gradation, PresetGain denotes a forced gain adjusted value, and PresetOfset denotes an offset adjusted value. The respective values of L, Preset-Gain and PresetOfset are adjusted in an inspection process or the like before shipment of the display device, and stored in the resistor built in the signal processing circuit 8. Namely, L, PresetGain and PresetOfset are values commonly used with respect to all of the photo sensor outputs.

Further, in the formula (5-2), DWhite(x,M) denotes digital data obtained in the signal processing circuit 8 by A/D converting the second panel output $V_{White}$ for calibration that has been acquired from the photo sensor at the address (x, M) according to the third operation mode. Here, although data corresponding to a panel output for one row whose y address is M are used for the DWhite, the y address of the data used for the DWhite will not be limited to M, but it can be determined arbitrarily.

DBlack(x,y) denotes digital data obtained in the signal processing circuit 8 by A/D converting the first panel output $V_{Black}$ for calibration that has been acquired from the photo sensor at the address (x, y) according to the second operation mode.

DDark(x,D1) and DDark(x,D2) denote digital data obtained in the signal processing circuit 8 by A/D converting the third panel output $V_{Dark}$ acquired from the photo sensor of the dummy pixel at the address (x,D1) and address (x, D2) according to the first operation mode. D1 and D2 denote y address of the dummy pixel provided to at least the upper or lower end in the y direction of the panel which are for instance, D1=1, and D2=M. Alternatively in a case where both the first and second rows of the y address are dummy pixels, D1=1 and D2=2 are acceptable. The photo sensors of these two rows where the y addresses are D1 and D2 can be read out selectively during the vertical blanking period.

'Dofset(x,y)" expressed by the formula (5-1) below is the actual offset value with respect to the panel output data obtained from the photo sensor within the effective pixel at the address (x,y) during the first operation mode. Further, Drange(x,y) expressed by the formula (5-2) denotes the actual gain value with respect to panel output data obtained from the photo sensor within the effective pixel at the address (x,y) during the first operation mode. Since the above L, PresetGain and PresetOfset are preset as resistor variables in the present embodiment, the calibration result taking these resistor variables into account are obtained by Deffect(x,y) expressed by the formula (5-3).

[Formula 1]

$$Dofset(x, y) = \qquad (5\text{-}1)$$

$$DBlack(x, y) + 1/2 * \left( \frac{\sum_{n=1}^{N} \{DDark(n, D1) - DBlack(n, D1)\}}{N} + \frac{\sum_{n=1}^{N} \{DDark(n, D2) - DBlack(n, D2)\}}{N} \right)$$

$$Drange(x,y) = Dwhite(x,M) - Dofset(x,y) \qquad (5\text{-}2)$$

$$Deffect(x,y) = PresetGain * [L/Drange(x,y) * \{DReal(x,y) - Dofset(x,y) - Presetofset\}] \qquad (5\text{-}3)$$

In the formula (5-1), data obtained from dummy pixels for two rows whose y addresses are D1 and D2 are used for DDark. Regarding the respective photo sensors in the respective rows of dummy pixels whose y=D1, D2, average values of difference between DDark and DBlack are calculated respectively. Further, the average of the above-noted average values obtained for the row of y=D1 and the row of y=D2 are calculated, and the thus obtained value is added to DBlack so as to calculate Dofset. In this manner, particularly, when the y addresses of D1 and D2 are set at the upper and lower ends of the pixel region, the temperature unevenness in the vertical direction of the pixel region 1 can be calibrated accurately.

However, the method for calculating Dofset is not limited to this example. For instance, formulae like (5-1-a) or (5-1-c) below can be used. According to these formulae, the calibration accuracy deteriorates a little in comparison with the case relating to the formula (5-1), but the calculation at the signal processing circuit 8 can be reduced. In the formula (5-1-a), only the data obtained from the dummy pixel whose y address is at the D1 row are used for DDark. As a variation of the formula (5-1-a), D1 can be replaced by D2 or any other dummy pixel rows. The formula (5-1-b) uses data obtained from the dummy pixel whose x address is at the column 1 and the dummy pixel whose x address is at the column N, as DDark. The formula (5-1-c) uses only the data obtained from the dummy pixel whose x address is at the column 1, as DDark. Here, the variation of the formula (5-1-c), for instance, the term DDark(1,y) can be replaced by DDark(N, y), and the term DBlack(1,y) can be replaced by DBlack((N, y).

[Formula 2]

$$Dofset(x, y) = \qquad (5\text{-}1\text{-}a)$$

$$DBlack(x, y) + \frac{\sum_{n=1}^{N} \{DDark(n, D1) - DBlack(n, D1)\}}{N}$$

$$Dofset(x,y) = DBlack(x,y) + \frac{1}{2} * (\{DDark(1,y) - Dblack(1,y)\} + \{DDark(N,y) - DBlack(N,y)\}) \qquad (5\text{-}1\text{-}b)$$

$$Dofset(x,y) = DBlack(x,y) + \{DDark(1,y) - DBlack(1,y)\} \qquad (5\text{-}1\text{-}c)$$

Furthermore, in the formula (5-1), DDark for the photo sensor in each of the dummy pixel rows of y=D1, D2 is used. Alternatively DDark for the photo sensor of a dummy pixel column can be used. The formula for the case is indicated in the formula (5-1-d). For this formula (5-1-d), variations similar to the formulae (5-1-b) and (5-1-c) with respect to the formula (5-1) can be considered.

[Formula 3]

$$Dofset(x, y) = \qquad (5\text{-}1\text{-}d)$$

$$DBlack(x, y) + 1/2 * \left( \frac{\sum_{m=1}^{M} \{DDark(D3, m) - DBlack(D3, m)\}}{M} + \frac{\sum_{m=1}^{M} \{DDark(D4, m) - DBlack(D4, m)\}}{M} \right)$$

As described above, in the display device according to the present embodiment, by suitably inserting a frame subjected to sensor drive according to the second operation mode and the third operation mode, the first panel output $V_{Black}$ for calibration and the second panel output $V_{White}$ for calibration are acquired. Further, in the first operation mode, a third panel output $V_{Dark}$ for calibration is acquired from the photo sensor within the dummy pixel. And the signal processing circuit 8 calibrates the photo sensor signal obtained from the effective pixel in the first operation mode, on the basis of these panel outputs for calibration. Thereby, the photo sensor signal can be calibrated automatically during operation of the display device. Further, by using the third panel output $V_{Dark}$ for calibration obtained from the photo sensor within the dummy pixel, variations in the dark current of the photodiode caused by the temperature change can be calibrated dynamically with accuracy.

[Second Embodiment]

A display device according to a second embodiment of the present invention will be described below. Components analogous to those in the first embodiment are assigned with identical reference numerals in order to avoid the duplication of explanations.

Figure 12:
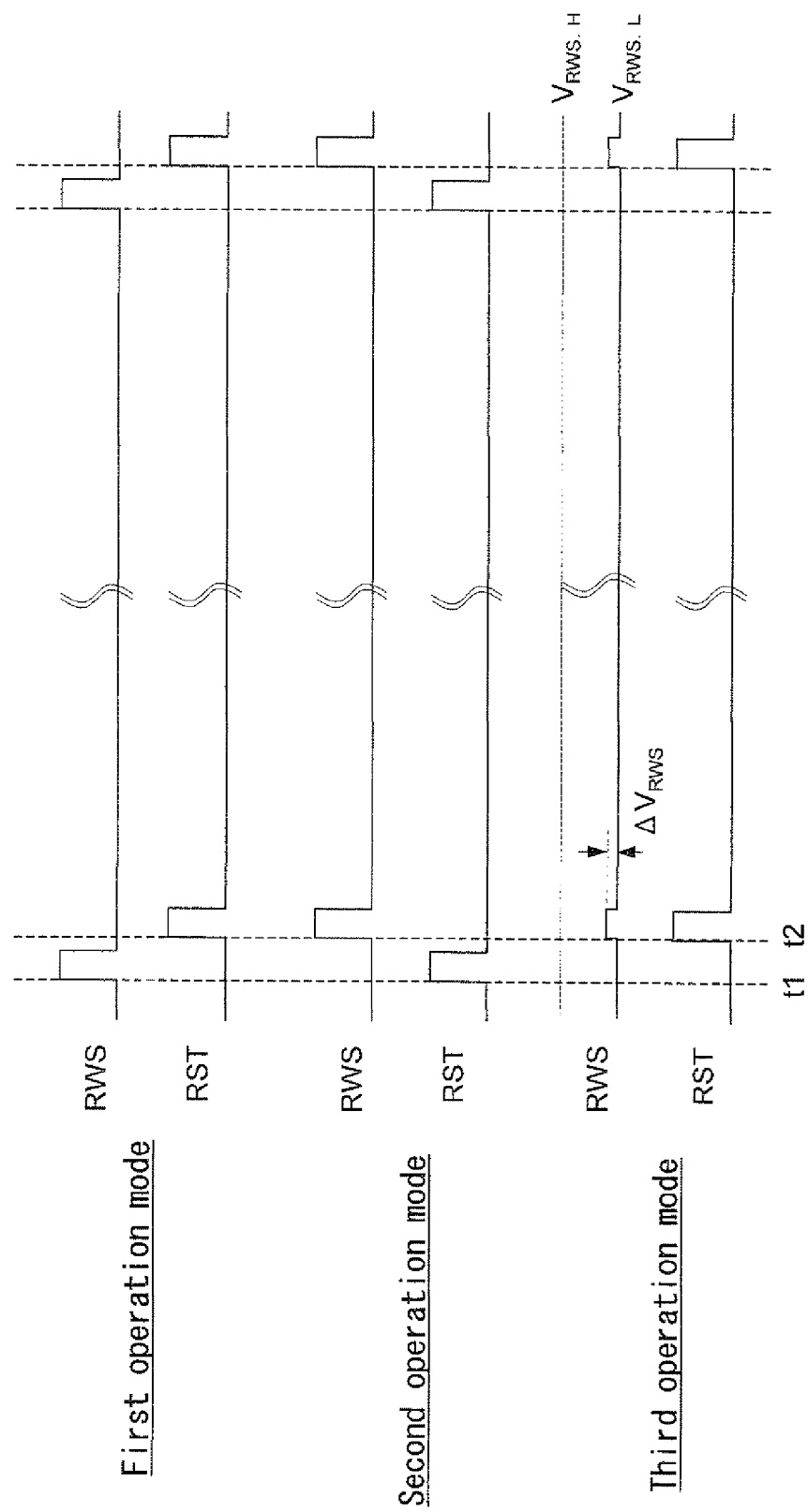
FIG. 12 is a waveform diagram showing another example of patterns of the reset signals and the readout signals in the respective first to third operation modes for a display device according to a second embodiment.
Figure 13A:
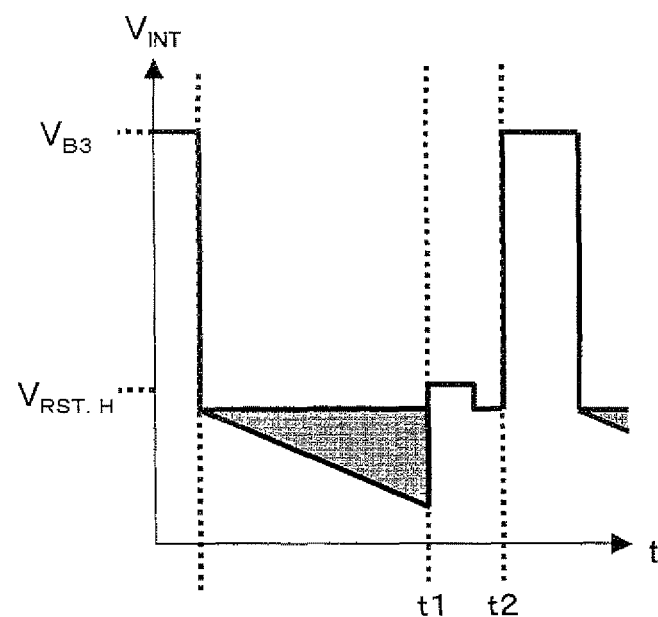
FIG. 13A is a waveform diagram of $V_{INT}$ in the second operation mode.
Figure 13B:
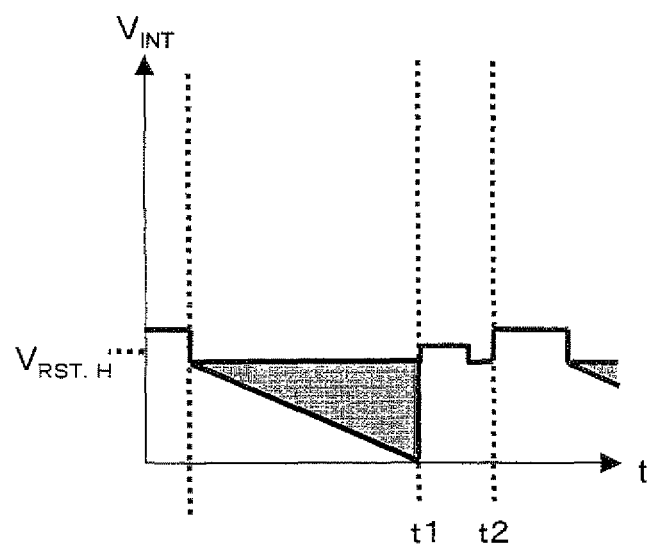
FIG. 13B is a waveform diagram of $V_{INT}$ in the third operation mode, for the display device according to the second embodiment.

FIG. 12 is a waveform diagram showing patterns of reset signals and readout signals in the respective first to third operation modes of a display device according to a second embodiment. FIGS. 13A and 13B are waveform diagrams showing transition of potentials $V_{INT}$ of the nodes INT in the second and the third operation modes respectively.

In the display device according to the first embodiment, during the third operation mode, the readout signal is kept constantly at a low level. In contrast, in the display device according to the second embodiment, during the third operation mode, a readout pulse whose amplitude is smaller in comparison with an ordinary readout signal is applied after the reset signal shifts to a high level as shown in FIG. 12. Other than that, the configuration and operation of the display device according to the second embodiment are the same as those of the display device according to the first embodiment. Namely, as shown in FIG. 12, in the display device according to the second embodiment, the waveforms of the reset signal and the readout signal during the first operation mode and the second operation mode are the same as the patterns shown in FIG. 10 for the first embodiment. Therefore, the transition of the potentials $V_{INT}$ of the nodes INT in the second operation mode as shown in FIG. 13A is the same as that of FIG. 11A.

The amplitude $\Delta V_{RWS.BLACK}$ of the readout signal in the second operation mode according to the present embodiment and the amplitude $\Delta V_{RWS.WHITE}$ of the readout signal in the third operation mode are expressed respectively by the formulae (6) and (7).

$$\Delta V_{RWS.BLACK} = V_{RWS.H} - V_{RWS.L} \quad (6)$$

$$\Delta V_{RWS.WHITE} = (V_{RWS.H} - V_{RWS.L}) + (V_F - \Delta V_{RST}) \cdot C_T / C_{INT} + \Delta V_{RST} \cdot C_{PD}/C_{INT} \quad (7)$$

The value of $\Delta V_{RWS.WHITE}$ is established in accordance with the procedures (1) to (3) in the final stage of the steps for manufacturing the display device.

(1) First, the pixel region 1 is irradiated with light of maximum illuminance level in the speculation for a display device while driving the photo sensors of the display device in the first operation mode, thereby acquiring a panel output $V_{OUT}$ in the situation. That is, the $V_{OUT}$ acquired here is a panel output at the time of a white level saturation (i.e., a state where the shift amount of the capacitance output of the photo sensor is saturated).

(2) Next, the second panel output $V_{White}$ is acquired while driving the photo sensors in the third operation mode. And $\Delta V_{RWS.WHITE}$ level is adjusted so that the value of the panel output $V_{White}$ at that time becomes equal to the panel output acquired in the above (1).

(3) Finally, the value of $\Delta V_{RWS.WHITE}$ adjusted in the above (2) is recorded on a memory such as EEPROM to which the sensor row driver 5 can refer.

Logically, the value of $\Delta V_{RWS.WHITE}$ can be expressed by the formula below. First, in the third operation mode, the potential $V_{INT}$ of the node INT in the case of applying a readout pulse subsequent to the reset pulse as shown in FIGS. 12 and 13B is expressed by the formula (8) below.

$$V_{INT} = V_{RST.H} - V_F - \Delta V_{RST} \cdot C_{PD}/C_T + \Delta V_{RWS.WHITE} \cdot C_{INT}/C_T \quad (8)$$

Here, when the sensor output is at the saturation level (white) in the first operation mode, the potential $V_{INT}$ of the node INT is expressed by the formula (9) below.

$$V_{INT} = V_{RST.L} + (V_{RWS.H} - V_{RWS.L}) \cdot C_{INT}/C_T \quad (9)$$

Therefore, in the third operation mode, for obtaining the panel output $V_{OUT}$ corresponding to the white saturation level, $\Delta V_{RWS.WHITE}$ should be determined to equalize the values of $V_{INT}$ in the formula (8) and $V_{INT}$ in the formula (9). Therefore, the above formula (7) regarding $\Delta V_{RWS.WHITE}$ can be obtained from the formula (10) below.

$$V_{RST.H} - V_F - \Delta V_{RST} \cdot C_{PD}/C_T + \Delta V_{RWS.WHITE} \cdot C_{INT}/C_T = V_{RST.L} + (V_{RWS.H} - V_{RWS.L}) \cdot C_{INT}/C_T \quad (10)$$

In the second operation mode, the potential $V_{INT}$ of the node INT at the time that the readout signal shifts to a high level is expressed by the following formula (11). Since this potential $V_{INT}$ becomes higher than the threshold voltage of the transistor M2, the transistor M2 becomes conductive and thus a panel output $V_{OUT}$ corresponding to the sensor output $V_{SOUT}$ from the photo sensor can be obtained. The value of the panel output $V_{OUT}$ at this time is used as the first panel output $V_{Black}$ for calibration of the panel output.

$$V_{INT} = V_{RST.H} - V_F - \Delta V_{RST} \cdot C_{PD}/C_T + \Delta V_{RWS.BLACK} \cdot C_{INT}/C_T \quad (11)$$

In the third operation mode, the potential $V_{INT}$ of the node INT at the time that the readout signal shifts to a high level is expressed by the above formula (8). Similarly, the potential $V_{INT}$ of the formula (8) becomes higher than the threshold voltage of the transistor M2, the transistor M2 becomes conductive, and a panel output $V_{OUT}$ corresponding to the sensor output $V_{SOUT}$ from the photo sensors is obtained. The value of the panel output $V_{OUT}$ at this time is used for the second panel output $V_{White}$ for calibration of the panel output.

In the first operation mode, acquisition of the third panel output $V_{Dark}$ for calibration from the dummy pixel is the same as that in the first embodiment, and thus the explanation is omitted.

In this manner, by using $V_{Black}$, $V_{White}$ and $V_{Dark}$ obtained in the second operation mode and the third operation mode, the signal processing circuit 8 calibrates the photo sensor signal obtained from the photo sensors within the effective pixels in the first operation mode, just like in the first embodiment. As mentioned above, in the display device according to the present embodiment, the photo sensor signal can be calibrated similarly during operation of the display device. Further, by using the third panel output $V_{Dark}$ for calibration obtained from the photo sensor within the dummy pixel, the variation in the dark current of the photodiode caused by the temperature change can be calibrated dynamically with accuracy.

The third operation mode in the first embodiment and the third operation mode in the second embodiment are different from each other in the following points. Namely, in the third operation mode of the first embodiment, the readout signal is kept at a low level and thus the transistor M2 remains in a nonconductive state. As a result, the value of the panel output $V_{OUT}$ does not reflect at all the light-receiving state of the photodiode D1, but represents only the offset caused by the circuit elements other than the photodiode D1. In contrast, in the third operation mode in the second embodiment, a readout pulse having an amplitude $\Delta V_{RWS.WHITE}$ that is bigger than zero and smaller than the amplitude of the readout signal in the first operation mode or the second operation mode is applied subsequent to the reset pulse. The value of this $\Delta V_{RWS.WHITE}$ is set as mentioned above so as to obtain $V_{White}$ corresponding to the panel output $V_{OUT}$ for the case where the sensor output from the photo sensor is at the white saturation level in the first operation mode. Therefore, according to the second embodiment, since the photo sensor signal can be calibrated by using $V_{White}$ corresponding to the white saturation level, not only the offset but also the gain can be calibrated accurately. Due to this feature, the second embodiment provides more advantageous effect in comparison with the first embodiment.

The present invention is not restricted to the above-described first and second embodiments, and various kinds of modifications can be made within the scope of the invention.

Figure 14:
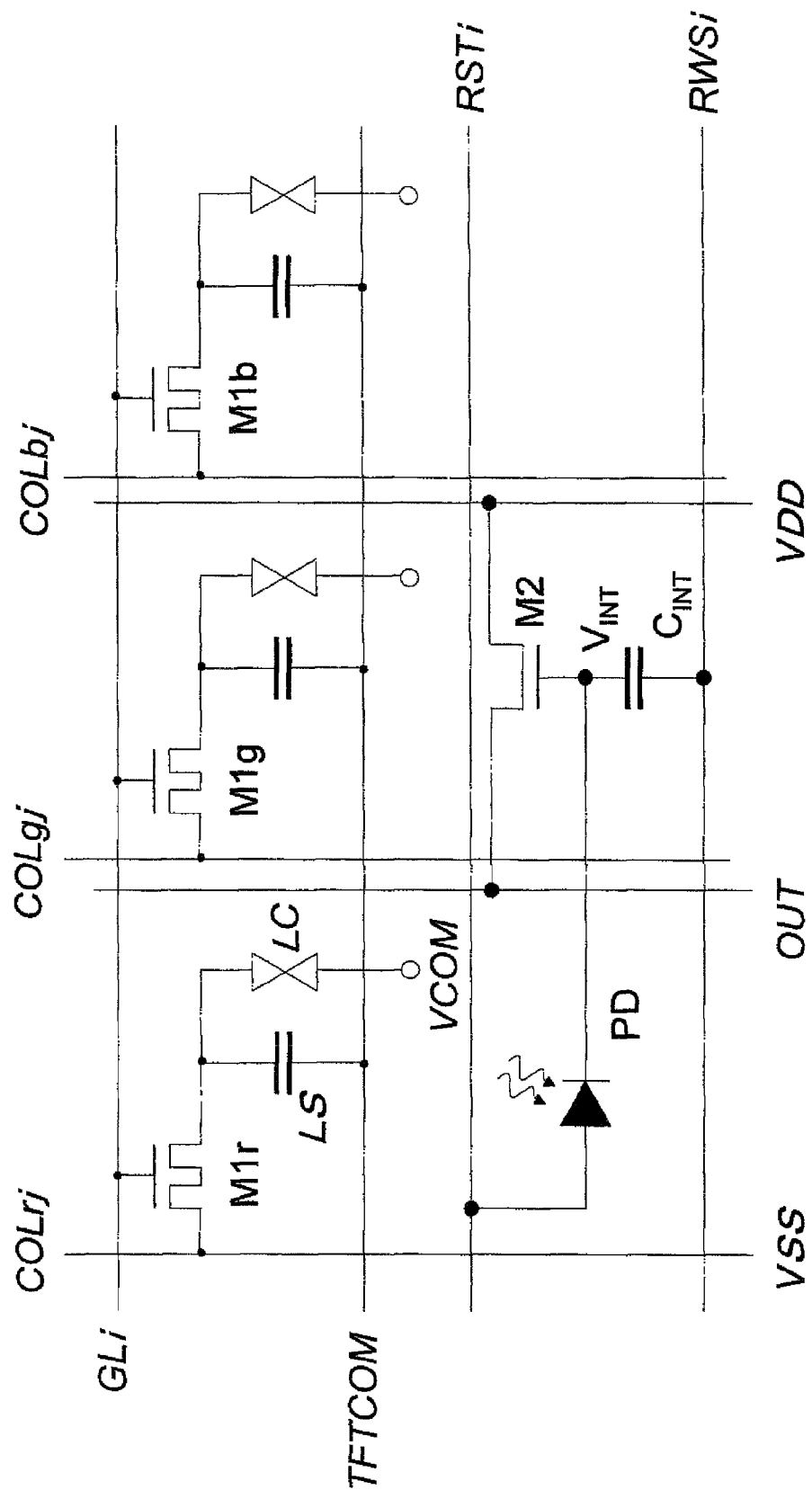
FIG. 14 is an equivalent circuit diagram showing a variation of the display device according to the embodiments of the present invention, which shows a configuration where wirings VDD and OUT of a photo sensor are provided separately from a source wiring COL.

For instance, the first and second embodiments show configurations where wirings VDD and OUT connected to photo sensors are shared with the source wirings COL. These configurations are advantageous for the high pixel numerical aperture. However, as shown in FIG. 14, even with a configuration where the wirings VDD and OUT for the photo sensors are provided separately from the source wag COL, the photo sensor signal can be calibrated automatically during the operation of the display device by performing a sensor drive similarly to the above embodiments, namely, the effect similar to those of the first and second embodiments can be obtained.

Industrial Applicability

The present invention provides a display device having photo sensors within pixels, which has an image-capturing function. In particular, the present invention provides an industrially applicable display device capable of calibration of panel output during operation of the display device.

The invention claimed is:

1. A display device comprising:
an active matrix substrate;
a photo sensor provided on a pixel region of the active matrix substrate;
a sensor drive wiring connected to the photo sensor;
a sensor drive circuit that supplies a sensor drive signal to the photo sensor via the sensor drive wiring;
an amplifier circuit that amplifies a sensor output read out from the photo sensor in accordance with the sensor drive signal and outputs the sensor output as a photo sensor signal; and
a signal processing circuit that processes the photo sensor signal outputted from the amplifier circuit,
wherein the sensor drive circuit has operation modes of:
a first operation mode for supplying a sensor drive signal of a first pattern to the photo sensor so as to output a photo sensor signal corresponding to a quantity of receiving light of the photo sensor to the signal processing circuit;
a second operation mode for supplying a sensor drive signal of a second pattern in a frame between frames subjected to a sensor drive according to the first operation mode to the photo sensor so as to acquire a first photo sensor signal level for calibration corresponding to a case where the photo sensor detects a black level; and
a third operation mode for supplying a sensor drive signal of a third pattern in a frame between frames subjected to a sensor drive according to the first operation mode to the photo sensor so as to acquire a second photo sensor signal level for calibration corresponding to a case where the photo sensor detects a white level,
the display device further comprising a dummy pixel covered with a light-shield film on the pixel region;
acquiring, during the first operation mode, the level of the photo sensor signal obtained on the basis of a sensor output from a photo sensor provided within the dummy pixel, as a third photo sensor signal level for calibration; and
calibrating the photo sensor signal obtained on the basis of the sensor output from the photo sensor provided within the effective pixel during the first operation mode, in the signal processing unit by using the first to third photo sensor signal levels.

2. The display device according to claim 1, wherein a level of a photo sensor signal obtained on the basis of sensor outputs from photo sensors provided within a plurality of rows of dummy pixels is used as the third photo sensor signal level.

3. The display device according to claim 1, a level of a photo sensor signal obtained on the basis of sensor outputs from photo sensors provided within a plurality of columns of dummy pixels is used as the third photo sensor signal level.

4. The display device according to claim 1, a level of a photo sensor signal obtained on the basis of sensor outputs from photo sensors provided within a plurality of dummy pixels belonging to a common row or a common column is used as the third photo sensor signal level.

5. The display device according to claim 1, a level of a photo sensor signal obtained on the basis of a sensor output from a photo sensor provided within a single dummy pixel is used as the third photo sensor signal level.

6. The display device according to claim 1, wherein the sensor drive wiring comprises a reset signal wiring connected to the photo sensor and a readout signal wiring connected to the photo sensor; and
the sensor drive signal comprises a reset signal supplied to the photo sensor via the reset signal wiring and a readout signal supplied to the photo sensor via the readout signal wiring.

7. The display device according to claim 6, wherein
the sensor drive circuit supplies the reset signal to the photo sensor and, supplies the readout signal after a predetermined time in the first operation mode, thereby outputting a photo sensor signal corresponding to the quantity of receiving light of the photo sensor within the predetermined time to the signal processing circuit;
the sensor drive circuit supplies to the photo sensor the readout signal after starting supply of the reset signal in the second operation mode, thereby acquiring a first photo sensor signal level for calibration; and
the sensor drive circuit supplies to the photo sensor, in the third operation mode, a readout signal whose amplitude is smaller in comparison with the readout signal in the first operation mode after starting supply of the reset signal, thereby acquiring a second photo sensor signal level for calibration.

8. The display device according to claim 7, wherein in the second operation mode, the sensor drive circuit starts supplying the readout signal after starting supply of the reset signal but before ending supply of the reset signal.

9. The display device according to claim 7, wherein in the third operation mode, the sensor drive circuit starts supplying the readout signal after starting supply of the reset signal but before ending supply of the reset signal.

10. The display device according to claim 7, wherein in the second operation mode, the sensor drive circuit starts supplying the readout signal after starting supply of the reset signal and after ending supply of the reset signal.

11. The display device according to claim 7, wherein in the third operation mode, the sensor drive circuit starts supplying the readout signal after starting supply of the reset signal and after ending supply of the reset signal.

12. The display device according to claim 6, wherein the amplitude of the readout signal in the third operation mode is zero.

13. The display device according to claim 6, wherein the amplitude of the readout signal in the third operation mode is a value for reading out a sensor output corresponding to a state where the shift quantity of capacitance output of the photo sensor is saturated.

14. The display device according to claim 13, wherein the photo sensor comprises a photodiode and a capacitor connected to a cathode of the photodiode; and
an amplitude $\Delta V_{RWS.WHITE}$ of a readout signal in the third operation mode is calculated through a formula:

$$\Delta V_{RWS.WHITE} = (V_{RWS.H} - V_{RWS.L}) + (V_F - \Delta V_{RST}) \cdot C_T / C_{INT} + \Delta V_{RST} \cdot C_{PD} / C_{INT}$$

$$\Delta V_{RST} = V_{RST.H} - V_{RST.L}$$

where $V_{RWS.H}$ denotes a high level potential of a readout signal in the first operation mode, $V_{RWS.L}$ denotes a low level potential of a readout signal in the first operation mode, $V_F$ denotes a forward voltage of the photodiode, $V_{RST.H}$ denotes a high level potential of a reset signal, $V_{RST.L}$ denotes a low level potential of a reset signal, $C_T$ denotes a capacitance of a node between the photodiode and the capacitor, $C_{PD}$ denotes a capacitance of the photodiode, and $C_{INT}$ denotes a capacitance of the capacitor.

15. The display device according to claim 1, wherein the photo sensor has one switching element for sensor.

16. The display device according to claim 1, further comprising:
a counter substrate that opposes the active matrix substrate; and
a liquid crystal interposed between the active matrix substrate and the counter substrate.

* * * * *